United States Patent
Matsumoto et al.

(10) Patent No.: US 9,854,618 B2
(45) Date of Patent: Dec. 26, 2017

(54) MOBILE COMMUNICATION SYSTEM AND USER TERMINAL

(71) Applicant: KYOCERA CORPORATION, Kyoto (JP)

(72) Inventors: Naohisa Matsumoto, Kawasaki (JP); Kugo Morita, Yokohama (JP); Masato Fujishiro, Yokohama (JP); Takahiro Saiwai, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/223,890

(22) Filed: Jul. 29, 2016

(65) Prior Publication Data

US 2016/0338127 A1   Nov. 17, 2016

Related U.S. Application Data

(63) Continuation of application No. PCT/JP2015/052413, filed on Jan. 28, 2015.
(Continued)

(51) Int. Cl.
*H04W 28/04* (2009.01)
*H04W 76/02* (2009.01)
(Continued)

(52) U.S. Cl.
CPC ......... *H04W 76/023* (2013.01); *H04W 8/005* (2013.01); *H04W 72/02* (2013.01); *H04W 72/042* (2013.01); *H04W 72/0406* (2013.01)

(58) Field of Classification Search
CPC ............. H04W 72/12; H04W 72/0413; H04W 72/0406; H04W 72/042; H04W 72/1289;
(Continued)

(56) References Cited

U.S. PATENT DOCUMENTS 8,839,362 B2 *   9/2014   Jung ..................... H04L 9/0844
                                                          726/2
9,351,209 B2 *   5/2016   Etemad ................. H04W 36/14
(Continued)

FOREIGN PATENT DOCUMENTS

| WO | 2013/141546 A1 | 9/2013 |
| WO | 2013/183732 A1 | 12/2013 |
| WO | 2014/017498 A1 | 1/2014 |

OTHER PUBLICATIONS

International Search Report issued in PCT/JP2015/052413; dated Apr. 21, 2015.
(Continued)

*Primary Examiner* — Andrew Chriss
*Assistant Examiner* — Rasha Fayed
(74) *Attorney, Agent, or Firm* — Studebaker & Brackett PC

(57) ABSTRACT

A first user terminal according to an embodiment comprises: at least one processor and at least one memory coupled to the processor. The processor is configured to perform processes of: determining first radio resources to be used for transmitting control information, the control information indicating location of second radio resources to be used for transmitting data by direct Device-to-Device communication; and directly transmitting the same control information repeatedly to a second user terminal in each resource block included in the first control resources.

9 Claims, 37 Drawing Sheets

Related U.S. Application Data

(60) Provisional application No. 61/934,305, filed on Jan. 31, 2014.

(51) Int. Cl.
*H04W 72/04* (2009.01)
*H04W 8/00* (2009.01)
*H04W 72/02* (2009.01)

(58) Field of Classification Search
CPC ........... H04W 72/1284; H04W 72/085; H04W 72/1268; H04W 72/087; H04W 72/04; H04W 72/1205; H04W 72/0486; H04W 72/1263; H04W 72/02; H04W 92/18; H04W 92/02; H04W 92/14; H04W 76/023; H04W 76/02; H04W 76/04; H04W 76/025; H04W 74/004; H04W 74/002; H04W 74/0866; H04W 74/0833; H04W 48/10; H04W 48/18; H04W 84/042; H04W 84/045; H04W 36/0066; H04W 52/0261; H04W 56/0015; H04W 48/12; H04L 1/1822; H04L 1/1896; H04L 1/1819; H04L 1/1835; H04L 1/188; H04L 1/1861; H04L 1/0026; H04L 1/0027; H04L 1/1854; H04L 1/1607; H04L 1/16; H04L 5/0053; H04L 5/0085; H04L 5/0007; H04L 5/0016; H04L 5/003; H04L 5/0092; H04L 12/26
USPC .................................................. 370/329, 336
See application file for complete search history.

(56) References Cited

U.S. PATENT DOCUMENTS

| | | | | |
|---|---|---|---|---|
| 2010/0009675 A1* | 1/2010 | Wijting | ................. | H04W 72/02 455/426.1 |
| 2010/0254340 A1* | 10/2010 | Park | .................. | H04W 72/1284 370/329 |
| 2011/0032887 A1* | 2/2011 | Kishiyama | .......... | H04J 13/0059 370/329 |
| 2013/0150061 A1* | 6/2013 | Shin | ...................... | H04W 4/005 455/450 |
| 2013/0229931 A1* | 9/2013 | Kim | ...................... | H04W 24/10 370/252 |
| 2013/0308551 A1* | 11/2013 | Madan | ................ | H04W 76/023 370/329 |
| 2013/0322413 A1* | 12/2013 | Pelletier | ............ | H04W 72/1289 370/336 |
| 2014/0003262 A1* | 1/2014 | He | ......................... | H04W 28/08 370/252 |
| 2014/0023008 A1* | 1/2014 | Ahn | ..................... | H04W 76/023 370/329 |
| 2014/0185495 A1* | 7/2014 | Kuchibhotla | ....... | H04W 76/023 370/281 |
| 2014/0185530 A1* | 7/2014 | Kuchibhotla | ....... | H04W 76/023 370/329 |
| 2015/0208453 A1 | 7/2015 | Yamazaki et al. | | |
| 2015/0245342 A1 | 8/2015 | Morita | | |
| 2016/0227518 A1* | 8/2016 | Li | ........................ | H04W 72/042 |
| 2016/0234045 A1* | 8/2016 | Lindoff | ............. | H04L 25/03866 |

OTHER PUBLICATIONS

Written Opinion issued in PCT/JP2015/052413; dated Apr. 21, 2015.
3rd Generation Partnership Project; Technical Specification Group RAN; Study on LTE Device to Device Proximity Services-Radio Aspects; 3GPP TR 36.843; V1.0.0; Technical Report; Nov. 2013; pp. 1-32; Release 12; 3GPP Organizational Partners.
Fujitsu; Further Analysis on Control Information for D2D Communication; 3GPP TSG RAN WG1 Meeting #75; R1-135141; Nov. 11-15, 2013; pp. 1-3; San Francisco, USA.
ZTE; Physical channel design for D2D communication; 3GPP TSG RAN WG1 Meeting #76; R1-140270; Feb. 10-14, 2014; pp. 1-4; Prague, Czech Republic.
Ericsson, 3GPP, R1-135804, "Synchronization Signals and Channel Design for D2D Discovery and Communication," San Francisco, CA, Nov. 11-15, 2013, 9 pp.
NEC, 3GPP, R1-140490, "Considerations of subframe design for D2D and cellular resource multiplexing," Prague, Czech Republic, Feb. 10-14, 2014, 4 pp.
The extended European search report issued by the European Patent Office on Aug. 2, 2017, which corresponds to European Patent Application No. 15743304.6-1854 and is related to U.S. Appl. No. 15/223,890.
Ericsson; D2D Scheduling Procedure; 3GPP TSG-RAN WG2 #84; Tdoc R2-134238; Nov. 11-15, 2013; pp. 1-6; San Francisco, USA.

\* cited by examiner

FIG. 18

```
SystemInformationBlockTypeX information element

D2D-Config ::=         SEQUENCE {
    d2d-sa-duration         ENUMERATED {sf4, sf8, sf16, sf32, sf64, sf128,
sf256, sf512},
    ~
```

FIG. 29

```
Preconfigured information element

D2D-Config-Preconfigured ::=        SEQUENCE {
    d2d-sa-duration                 ENUMERATED {sf1, sf2, sf4, sf8, sf16, sf32, sf64,
sf128, sf256, sf512, sf1024, sf2048},
...
```

FIG. 30

```
SystemInformationBlockTypeX information element

D2D-Config ::=        SEQUENCE {
    d2d-sa-duration        ENUMERATED {sf4, sf8, sf16, sf32, sf64, sf128,
sf256, sf512},
    ...
}
```

MOBILE COMMUNICATION SYSTEM AND USER TERMINAL

RELATED APPLICATIONS

This application is a continuation application of international application PCT/JP2015/052413, filed Jan. 28, 2015, which claims benefit of U.S. provisional Application No. 61/934,305, filed on Jan. 31, 2014, the entirety of all applications hereby expressly incorporated by reference.

TECHNICAL FIELD

The prevent disclosure relates to a mobile communication system that supports D2D communication, and a user terminal thereof.

BACKGROUND

In 3GPP (3rd Generation Partnership Project) which is a project aiming to standardize a mobile communication system, the introduction of Device to Device (D2D) proximity service is discussed as a new function after Release 12 (see Non Patent Document 1).

The D2D proximity service (D2D ProSe) is a service in which direct communication is enabled without passing through a network within a synchronization cluster formed by a plurality of synchronized user terminals. The D2D proximity service includes a discovery process (Discovery) in which a proximal terminal is discovered and a communication process (Communication) in which direct communication is performed.

PRIOR ART DOCUMENT

Non-Patent Document

Non Patent Document 1: 3GPP technical report "TR 36.843 V1.0.0" Jan. 16, 2014

SUMMARY

Meanwhile, when a user terminal decides a time-frequency resource (hereinafter, referred to as a data resource, where appropriate) used for transmitting D2D communication data, it may be considered that in order to inform peripheral user terminals of the decided data resource, the user terminal transmits control information indicating a location of the decided data resource.

However, a user terminal intended to receive the control information may have to scan all time-frequency areas in which a time-frequency resource (hereinafter, referred to as a control resource, where appropriate) used for transmitting the control information is likely to be arranged.

Therefore, an object of the present disclosure is to provide a mobile communication system and a user terminal with which it is possible to efficiently scan control information.

A first user terminal according to an embodiment, comprises: at least one processor and at least one memory coupled to the processor. The processor configured to perform processes of: determining first radio resources to be used for transmitting control information, the control information indicating location of second radio resources to be used for transmitting data by direct Device-to-Device communication; and directly transmitting the same control information repeatedly to a second user terminal in each resource block included in the first control resources.

An apparatus for a first user terminal according to an embodiment comprises: at least one processor and at least one memory coupled to the processor. The processor configured to perform processes of: determining first radio resources to be used for transmitting control information, the control information indicating location of second radio resources to be used for transmitting data by direct Device-to-Device communication; and directly transmitting the same control information repeatedly to a second user terminal in each resource block included in the first control resources.

BRIEF DESCRIPTION OF THE DRAWINGS

FIG. 18 is a diagram for illustrating SIB according to the modification 1 of the operation example 4.

FIG. 29 is a diagram for illustrating the operation example 7.

FIG. 30 is a diagram for illustrating the operation example 7.

DETAILED DESCRIPTION

Figure 1:
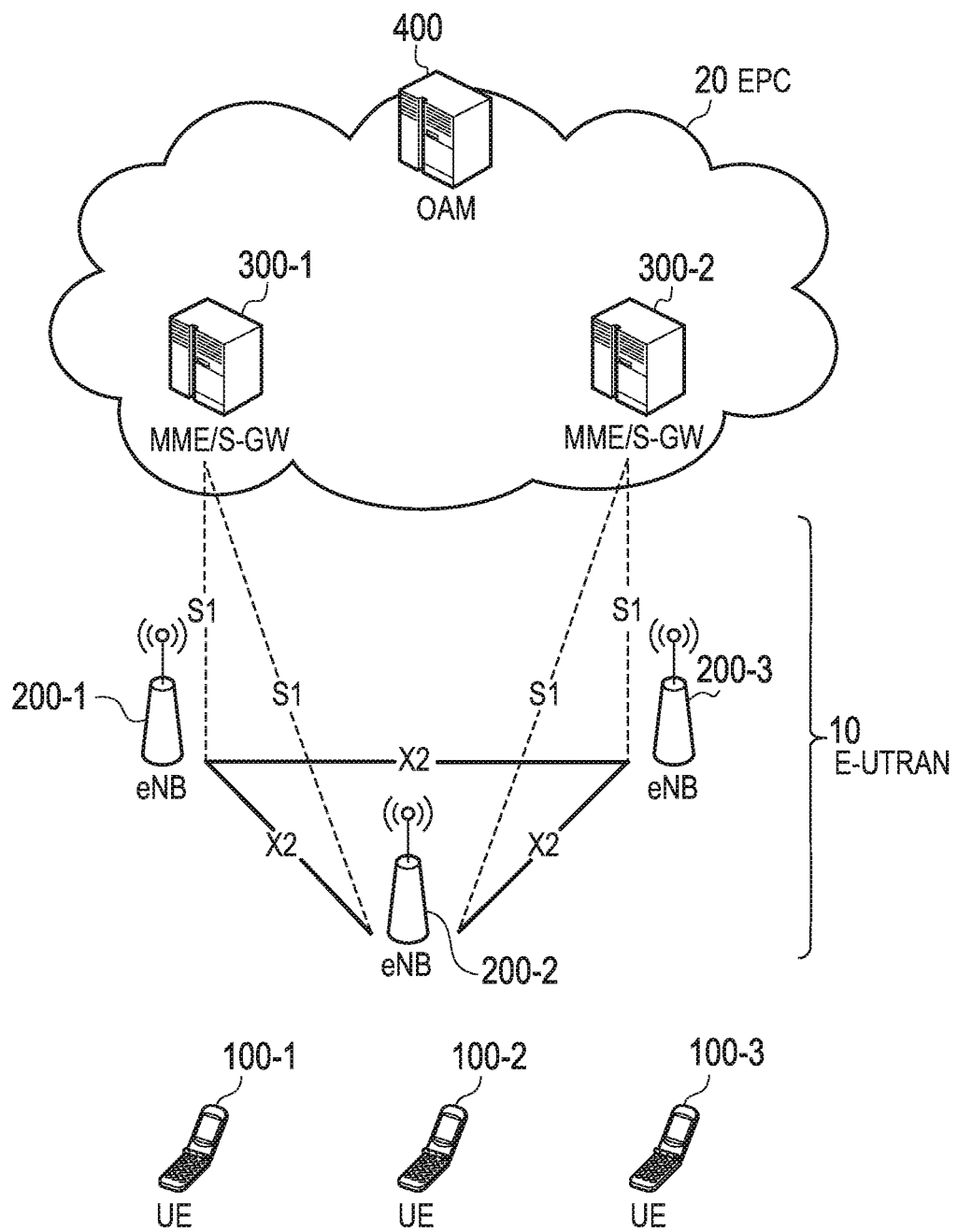
FIG. 1 is a configuration diagram of an LTE system.

A first user terminal according to an embodiment, comprises: at least one processor and at least one memory coupled to the processor. The processor configured to perform processes of: determining first radio resources to be used for transmitting control information, the control information indicating location of second radio resources to be used for transmitting data by direct Device-to-Device communication; and directly transmitting the same control information repeatedly to a second user terminal in each resource block included in the first control resources.

The processor may be configured to perform the process of randomly determining the first radio resources from a resource area in which radio resources, which is able to be used for transmitting the control information, is arranged.

The processor may be configured to perform a process of receiving information on the first radio resources from a base station.

The processor may be configured to perform the process of receiving the information by downlink control information from the base station.

The processor may be configured to perform the process of receiving the information by a Radio Resource Control (RRC) message from the base station.

The processor may be configured to perform the process of transmitting the information if the first user terminal exists in a cell managed by the base station.

An apparatus for a first user terminal according to an embodiment comprises: at least one processor and at least one memory coupled to the processor. The processor configured to perform processes of: determining first radio resources to be used for transmitting control information, the control information indicating location of second radio resources to be used for transmitting data by direct Device-to-Device communication; and directly transmitting the same control information repeatedly to a second user terminal in each resource block included in the first control resources.

A mobile communication system according to an embodiment is a mobile communication system that supports a D2D proximity service in which direct communication not passing through a network is enabled, and comprises: a first user terminal configured to decide a control resource that is a time-frequency resource used for transmitting control information indicating a location of a data resource that is a time-frequency resource used for transmitting D2D communication data, from a control resource area having a limited range among time-frequency resources available for the D2D proximity service, and a second user terminal configured to perform a scan of the control information within the control resource area.

The mobile communication system according to the embodiment comprises a base station configured to transmit control resource information for designating the control resource area, the control resource, or a candidate of the control resource area, to the first user terminal.

In the embodiment, the first user terminal exists in a cell managed by the base station, and when the first user terminal does not receive the control resource information from the base station, and when an unused data resource exists, the first user terminal transmits the control information indicating the location of the unused data resource.

In the embodiment, when the first user terminal exists in a cell managed by the base station, the first user terminal transmits the control resource information.

The mobile communication system according to the embodiment comprises a third user terminal located out of coverage, wherein when the first user terminal receives, from the third user terminal, flag information indicating that the third user terminal is located out of coverage, the first user terminal transmits the control resource information to the third user terminal.

In the embodiment, the third user terminal previously stores configuration information for limiting a range of the control resource area, and when the third user terminal receives the control resource information from the first user terminal, the third user terminal prioritizes the control resource information over the configuration information and decides the control resource.

In the embodiment, the first user terminal previously stores configuration information for limiting a range of the control resource area, the configuration information indicates the control resource area provided in a first cycle, and the base station transmits, to the first user terminal, the control resource information for indicating the control resource area provided in a second cycle that is an integral multiple or an integral submultiple of the first cycle.

In the embodiment, by using the data resource, the first user terminal transmits, together with the D2D communication data, the control information indicating the location of a next data resource of the data resource.

In the embodiment, the control information is arranged in an area following an area in which a last D2D communication data is arranged within the data resource divided into a plurality of areas.

In the embodiment, in addition to providing the control resource within the data resource, the first user terminal periodically provides the control resource outside the data resource.

In the embodiment, when the data resource is divided into a plurality of small data resources, the first user terminal transmits the same control information using each of the plurality of small data resources.

In the embodiment, in the data resource, the first user terminal applies, to the control information, a modulation and coding scheme having an error resilience that is higher than a modulation and coding scheme applied to the D2D communication data.

In the embodiment, a plurality of types of transmission modes having different methods of improving the error resilience of control information are defined, and the first user terminal selects a transmission mode to be applied to transmitting the control information from among a plurality of types of transmission modes depending on an application used in the D2D communication.

In the embodiment, the control resource is periodically provided in a time axis direction, depending on the location of the control resource in a previous cycle, the range of a control resource area in a next cycle is limited, and the first user terminal decides the control resource in the next cycle depending on the location of the control resource in the previous cycle.

In the embodiment, before starting a decision regarding the control resource, the first user terminal performs a scan of the control information within the control resource area, and the first user terminal decides the control resource in the next cycle on a basis of an unused time-frequency resource within the scanned control resource area.

In the embodiment, a data resource area having a limited range from among the time-frequency resources available for the D2D proximity service is periodically provided in a time axis direction, the range of the data resource area is limited depending on the location of the control resource, before starting a decision regarding the control resource, the first user terminal performs a scan of the D2D communication data within the data resource area, the first user terminal assumes the time-frequency resource within the control resource that should indicate the location of the unused time-frequency resource on a basis of the unused time-frequency resource within the scanned data resource area, and the first user terminal decides the control resource in the next cycle on a basis of the assumed time-frequency resource.

In the embodiment, when the second user terminal detects a collision of the control information as a result of scanning of the control information, the second user terminal transmits collision information indicating the collision of the control information, and when the first user terminal receives the collision information, the first user terminal thinks about a change in the location of the control resource.

In the embodiment, even when the first user terminal receives the collision information, the first user terminal omits the thinking about a change in the location of the control resource when the control information is transmitted periodically in continuation.

In the embodiment, the first user terminal calculates a range of the control resource area on a basis of a unique value of the first user terminal.

In the embodiment, together with indicating a location of the data resource, the control information indicates a location of a control resource indicating a location of a next data resource of the data resource.

In the embodiment, the control resource area includes a group area and a broadcast area, in the group area, the control resource for a plurality of user terminals configuring a D2D group are provided, and in the broadcast area, the control resource for an unspecified user terminal is provided.

In the embodiment, the first user terminal shares the control resource area dedicated to one D2D group, to which the first user terminal belongs, with a plurality of user terminals configuring the one D2D group.

In the embodiment, the first user terminal uses the control resource to transmit, together with the control information, flag information indicating whether or not the first user terminal is located out of coverage.

In the embodiment, the control resource information is information for designating the control resource, and the base station transmits the control resource information by using downlink control information.

In the embodiment, the control resource information is information for designating the range of the control resource, and the base station transmits the control resource information by using an RRC message.

A mobile communication system according to the embodiment is a mobile communication system that supports a D2D proximity service in which direct communication not passing through a network is enabled, and comprises: a user terminal configured to decide a control resource that is a time-frequency resource used for transmitting control information indicating a location of a data resource that is a time-frequency resource used for transmitting D2D communication data, from time-frequency resources available for the D2D proximity service, and the user terminal uses the decided control resource repeatedly to transmit the same control information at a bit level or in units of resource blocks.

A user terminal according to the embodiment is a user terminal used in a mobile communication system that supports a D2D proximity service in which direct communication not passing through a network is enabled, and comprises: a control unit configured to decide a control resource that is a time-frequency resource used for transmitting control information indicating a location of a data resource that is a time-frequency resource used for transmitting D2D communication data, from a control resource area having a limited range among time-frequency resources available for the D2D proximity service.

Embodiment

Hereinafter, the embodiment in a case where the present disclosure is applied to a LTE system will be described.

(System Configuration)

FIG. 1 is a configuration diagram of the LTE system according to a present embodiment.

As shown in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 manages a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes MME (Mobility Management Entity)/S-GW (Serving-Gateway) 300 and OAM 400 (Operation and Maintenance). Further, the EPC 20 corresponds to a core network.

The MME is a network node that performs various mobility controls and the like, for the UE 100 and corresponds to a controller. The S-GW is a network node that performs control to transfer user data and corresponds to a mobile switching center.

The OAM 400 is a server device managed by an operator and performs maintenance and monitoring of the E-UTRAN 10.

Next, configurations of the UE 100 and the eNB 200 will be described.

Figure 2:
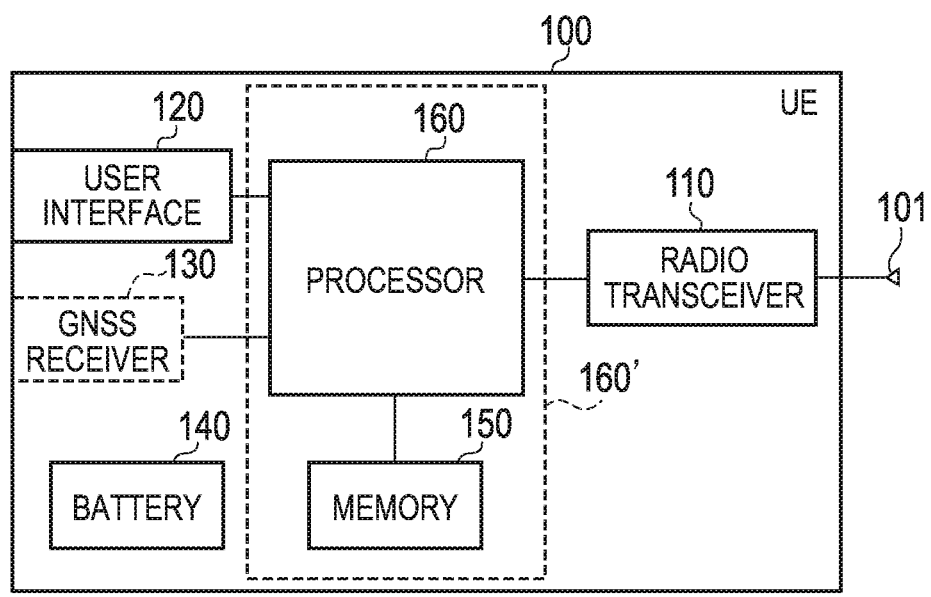
FIG. 2 is a block diagram of UE.

FIG. 2 is a block diagram of the UE 100. As shown in FIG. 2, the UE 100 includes an antenna 101, a radio transceiver 110, a user interface 120, GNSS (Global Navigation Satellite System) receiver 130, a battery 140, a memory 150, and a processor 160. The memory 150 and the processor 160 configure a control unit.

The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
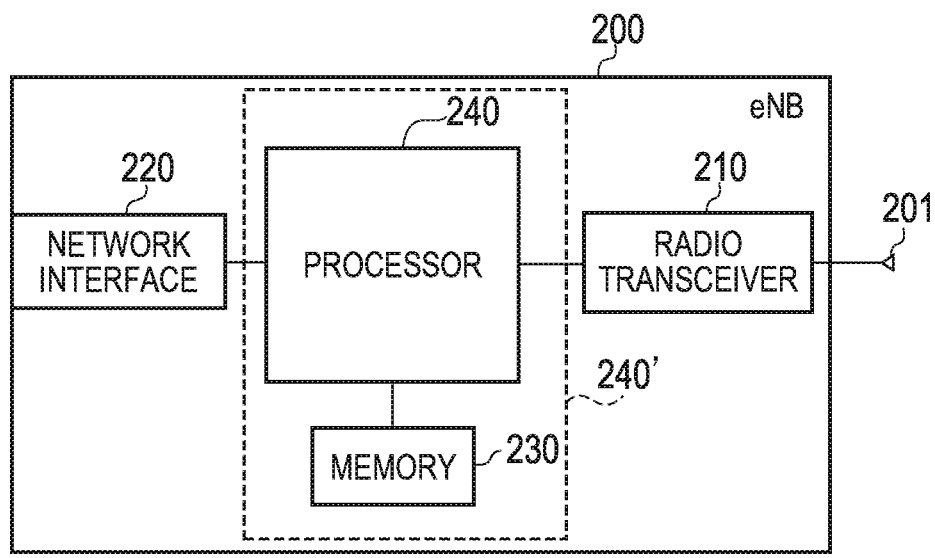
FIG. 3 is a block diagram of eNB.

FIG. 3 is a block diagram of the eNB 200. As shown in FIG. 3, the eNB 200 includes an antenna 201, a radio transceiver 210, a network interface 220, a memory 230, and a processor 240. The memory 230 and the processor 240 constitute a control unit. In addition, the memory 230 is integrated with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
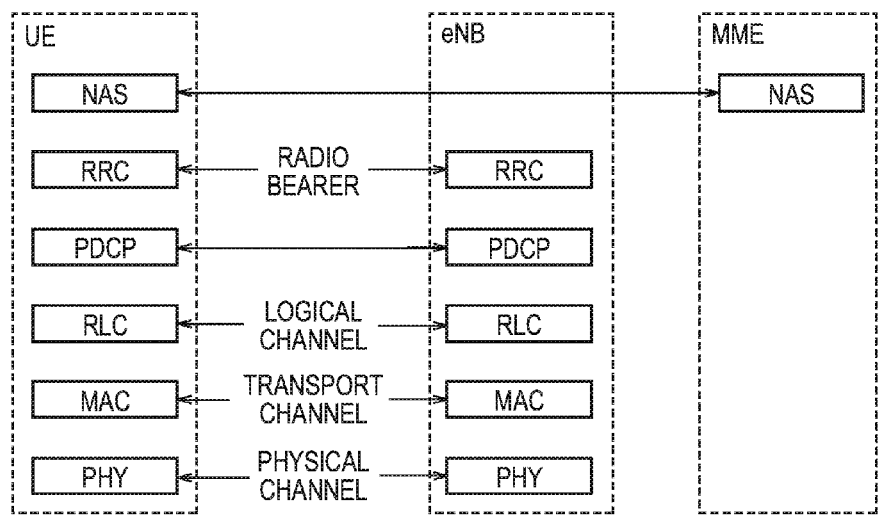
FIG. 4 is a protocol stack diagram of a radio interface in an LTE system.

FIG. 4 is a protocol stack diagram of a radio interface in the LTE system.

As shown in FIG. 4, the radio interface protocol is classified into a layer 1 to a layer 3 of an OSI reference model, wherein the layer 1 is a physical (PHY) layer. The layer 2 includes MAC (Media Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a MAC scheduler to decide a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

NAS (Non-Access Stratum) layer positioned above the RRC layer performs session management, mobility management and the like.

Figure 5:
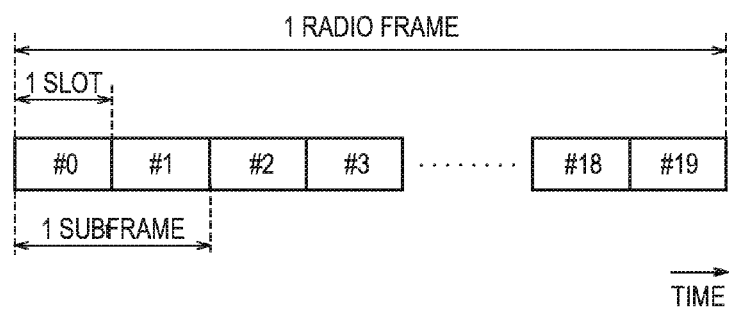
FIG. 5 is a configuration diagram of a radio frame used in an LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As shown in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region that can be mainly used as a physical uplink shared channel (PUSCH). Moreover, in each subframe, a demodulation reference signal (DMRS) and a sounding reference signal (SRS) are arranged.

(D2D Communication)

Next, description will be provided by comparing the D2D communication with the normal communication (the cellular communication) in the LTE system.

Figure 6:
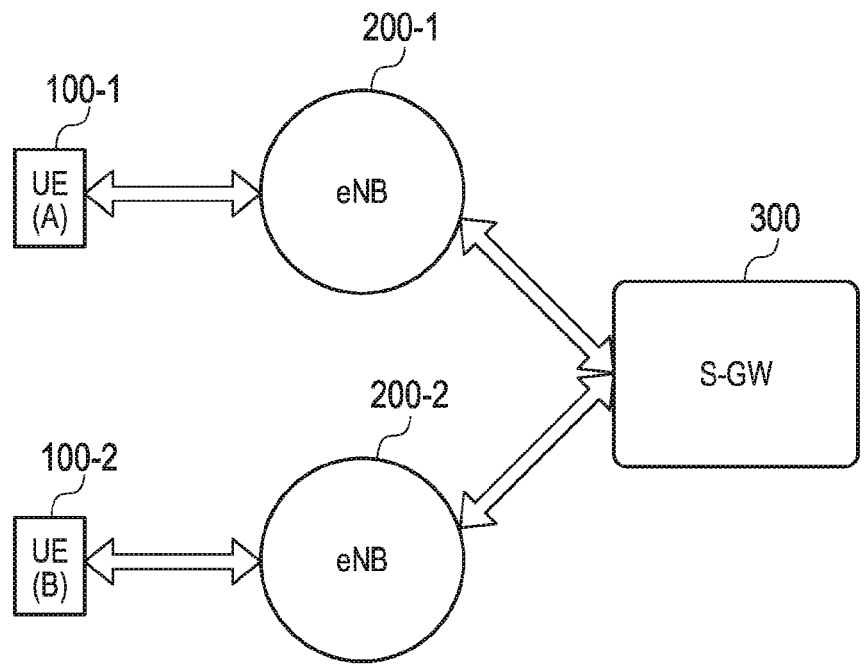
FIG. 6 is a diagram illustrating a data path in cellular communication.

FIG. 6 is a diagram illustrating a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

Figure 7:
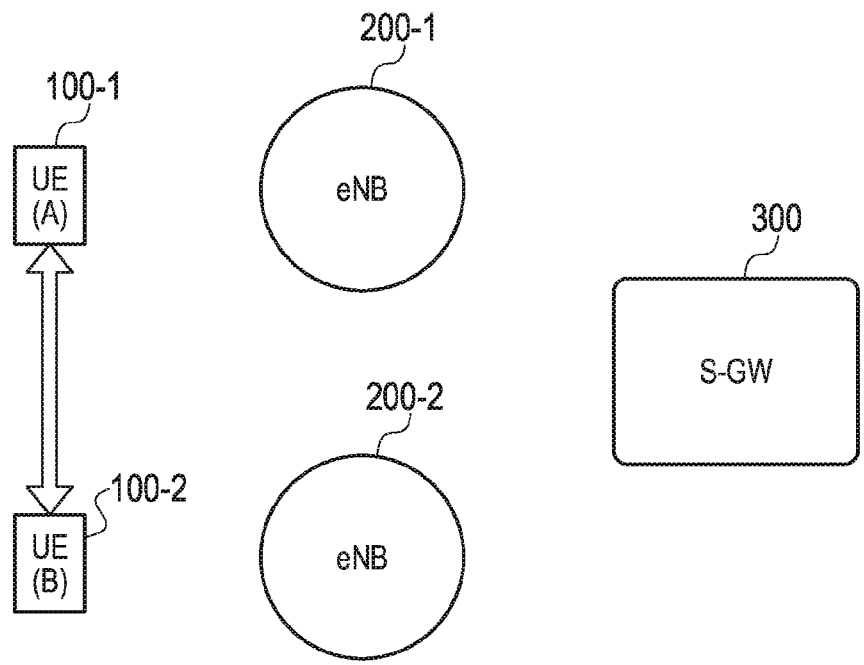
FIG. 7 is a diagram illustrating a data path in D2D communication.

FIG. 7 is a diagram illustrating a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not pass through the network. That is, direct radio communication is performed between UEs. As described above, when the UE 100-2 exists in the vicinity of the UE 100-1, the D2D communication is performed between the UE 100-1 and the UE 100-2, thereby obtaining an effect that a traffic load on the network and a battery consumption amount of the UE 100 are reduced, for example.

It is noted that cases in which the D2D communication is started include (a) a case in which the D2D communication is started after a proximal terminal is discovered by performing an operation for discovering a proximal terminal, and (b) a case in which the D2D communication is started without performing an operation for discovering a proximal terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximal terminal, the UE 100 has a (Discover) function of discovering another UE 100 existing in the proximity of the UE 100, and/or a (Discoverable) function of being discovered by another UE 100.

Specifically, the UE 100-1 transmits a discovery signal (Discovery signal/Discoverable signal) that is used to either discover a proximal terminal or to be discovered by a proximal terminal. The UE 100-2 that receives the discovery signal discovers the UE 100-1. When the UE 100-2 transmits a response to the discovery signal, the UE 100-1 that has transmitted the discovery signal discovers the UE 100-2, which is the proximal terminal.

It is noted that the UE 100 need not necessarily perform the D2D communication even upon discovering a proximal terminal, for example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts. It is noted that when the UE 100-1 does not perform the D2D communication after discovering a proximal terminal, the UE 100-1 may report, to an upper layer (for example, an application), the discovery of the proximal UE 100 (that is, the UE 100-2). For example, the application is capable of executing a process based on the report (for example, a process of plotting the position of the UE 100-2 in the geographical information).

Moreover, the UE 100 is capable of reporting the discovery of a proximal terminal to the eNB 200, and is also capable of receiving, from the eNB 200, an instruction regarding whether to communicate with the proximal terminal through the cellular communication or through the D2D communication.

On the other hand, in the above-described case (b), for example, the UE 100-1 starts the transmission (such as a notification through broadcasting) of a signal for the D2D communication without specifying a proximal terminal. Thus, the UE 100 is capable of starting the D2D communication regardless of the existence of the discovery of a proximal terminal. It is noted that the UE 100-2 that is performing the standby operation for the signal for the D2D communication performs synchronization or/and demodulation on the basis of the signal from the UE 100-1.

(Decision of Control Resource and Data Resource)

Next, an operation, in which the UE 100 decides a control resource and a data resource, will be described.

The UE 100 decides a control resource (a SA resource), which is a time-frequency resource used for transmitting control information (SA: Scheduling Assignment) indicating a location of the data resource, from among the time-frequency resources available for the D2D proximity service.

Figure 8:
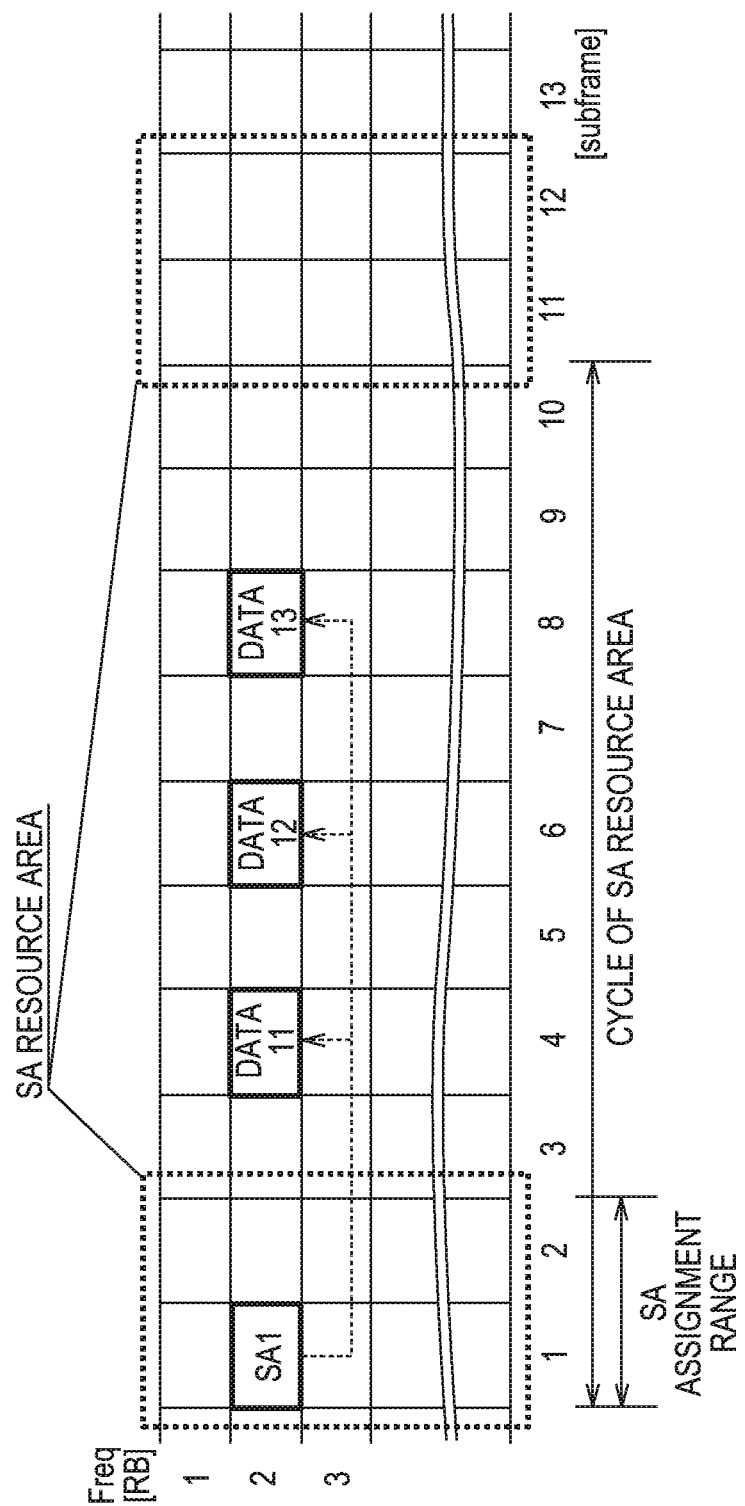
FIG. 8 is a configuration diagram of a radio frame for illustrating a mobile communication system according to an embodiment.
Figure 9:
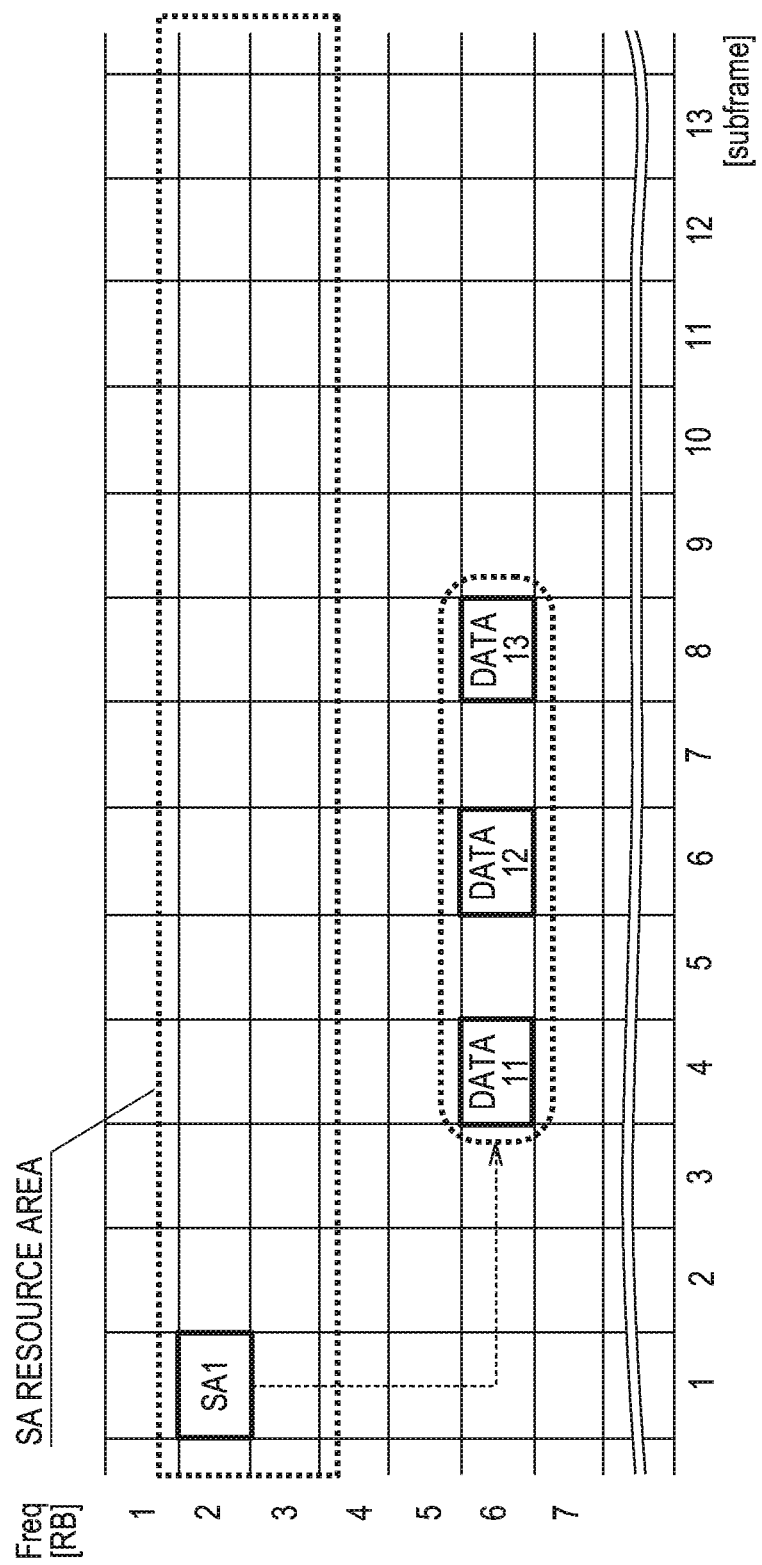
FIG. 9 is a configuration diagram of a radio frame for illustrating a mobile communication system according to an embodiment.

Specifically, the UE 100 decides the SA resource from a control resource area (a SA resource area) having a limited range, from among the time-frequency resources available for the D2D proximity service. The SA resource area is an area in which SA resources used to transmit SA by the UE 100 are arranged. For example, the SA resource area is concentrated in a predetermined range. Specifically, as shown in FIG. 8, the SA resource area may be provided periodically in a time axis direction, or as shown in FIG. 9, the SA resource area may be provided in a predetermined frequency band. As described later, the range of the SA resource area is limited on the basis of SA resource information transmitted from the eNB 200 or configuration information (Pre-config) that is previously stored in the UE 100.

Moreover, the UE 100-1 decides a data resource, which is a time-frequency resource used for transmitting the D2D communication data, from among time-frequency resources available for a D2D proximity service.

The UE 100 is capable of deciding the data resources from the data resource area with a limited range in the time-frequency resources available for the D2D proximity service. The data resource area is an area in which data resources used to transmit the D2D communication data by the UE 100 are arranged. For example, the data resource area is the area excluding the SA resource area from the area in which the time-frequency resources available for the D2D proximity service are arranged. As described later, the range of the data resource area may be limited on the basis of data resource information transmitted from the eNB 200 or configuration information.

The UE 100 uses the decided SA resource to transmit the SA (SA 1) indicating the locations of the decided data resources (DATAs 11 to 13). On the other hand, the other UE 100 receives the SA by scanning the SA within the SA resource area with a limited range. The SA allows the other UE 100 that receives the SA to grasp the locations of data resources, which are used by the UE 100 to transmit D2D communication data. By scanning the locations (area) of the grasped data resources, the UE 100 is capable of receiving the D2D communication data from the UE 100-1.

It is noted that as shown in FIG. 8, the SA may directly indicate the data resources, or as shown in FIG. 9, the SA may indicate the range of the data resources.

(Range of SA Resource Area)

The UE 100 limits the range of the SA resource area on the basis of SA resource information transmitted from the eNB 200 or configuration information (Pre-config) that is previously stored in the UE 100.

The SA resource information and the configuration information is information for designating an SA resource area, an SA resource, or candidates of the SA resource area. The SA resource information may be an assignment rule for limiting the range of the SA resource area. For example, the SA resource information includes information indicating at least any one of a frequency band and/or a time zone of the SA resource area, an offset (a time and/or a frequency), and a cycle (a time).

The offset, for example, is expressed using the following Equation.

$$(\text{offset}) = (SFN \times 10 + \text{subframe}) \bmod (\text{cycle})$$

Furthermore, the SA resource information may include information indicating at least any one of a size of one SA resource, the number of SA resources assignable by the UE 100 (and/or the presence or absence of the SA resource), and a modulation and coding scheme (MCS) applied to the SA.

For example, in FIG. 8, the SA resource information includes the time zone of the SA resource area (the assignment range of the SA), the cycle of the SA resource area, and the offset of the SA. The UE 100 limits the range of the SA resource area on the basis of the SA resource information and the following Equation.

$$((SFN \times 10 + \text{subframe}) - (\text{offset of SA})) \bmod (\text{cycle of SA resource area}) < (\text{assignment range of SA})$$

Moreover, in FIG. 9, the SA resource information is a frequency band of the SA resource area.

The UE 100 may decide a data resource on the basis of the data resource information received from the eNB 200.

It is noted that the data resource information is information for designating a data resource area, a data resource, or a candidate of the data resource area. The data resource information could also be an assignment rule for limiting the range of the data resource area. For example, the data resource information includes information indicating at least any one of a frequency band and/or a time zone of the data resource area, a cycle (a time) of the data resource area, an offset (a time and/or a frequency) from SA indicating a data resource start, and a data resource interval. The data resource information may include information indicating at least any one of a resource size of one data resource, the number of data resources, and a modulation and coding scheme (MCS) applied to D2D communication data.

The configuration information may include information having the same content as the data resource information. It is noted that the UE 100 is capable of updating the configuration information on the basis of update information received from the eNB 200.

Since the UE 100 scans the SA within the SA resource area with a limited range, it is possible to effectively scan the SAs. Moreover, since the UE 100 scans the data resources within the data resource area with a limited range, it is possible to effectively scan the data resources.

It is noted that the eNB 200 is capable of transmitting the SA resource information to the UE 100 by at least one of an RRC message (for example, SIB (System Information Block)) or DCI (Downlink Control Information). For example, in the case of transmitting the SA resource information for (directly) designating an SA resource, the eNB 200 is capable of transmitting the SA resource information by using DCI. On the other hand, in the case of transmitting the SA resource information for (directly) designating the range (that is, an SA resource area) of the SA resources, the eNB 200 is capable of transmitting the SA resource information by using an RRC message (for example, SIB).

The eNB 200 is capable of transmitting the data resource information to the UE 100 by at least one of an RRC message (for example, SIB) or DCI. For example, in the case of transmitting the data resource information for (directly) designating a data resource, the eNB 200 is capable of transmitting the data resource information by using DCI. On the other hand, in the case of transmitting the data resource information for (directly) designating a range (that is, a data resource area) of the data resource, the eNB 200 is capable of transmitting the data resource information by using an RRC message (for example, SIB).

(Operation Example According to the Present Embodiment)

Next, an operation example according to the present embodiment will be described. It is noted that a description will be provided while focusing on a portion different from the other operation examples, and a description of a similar portion will be appropriately omitted.

(A) Operation Example 1

Figure 10:
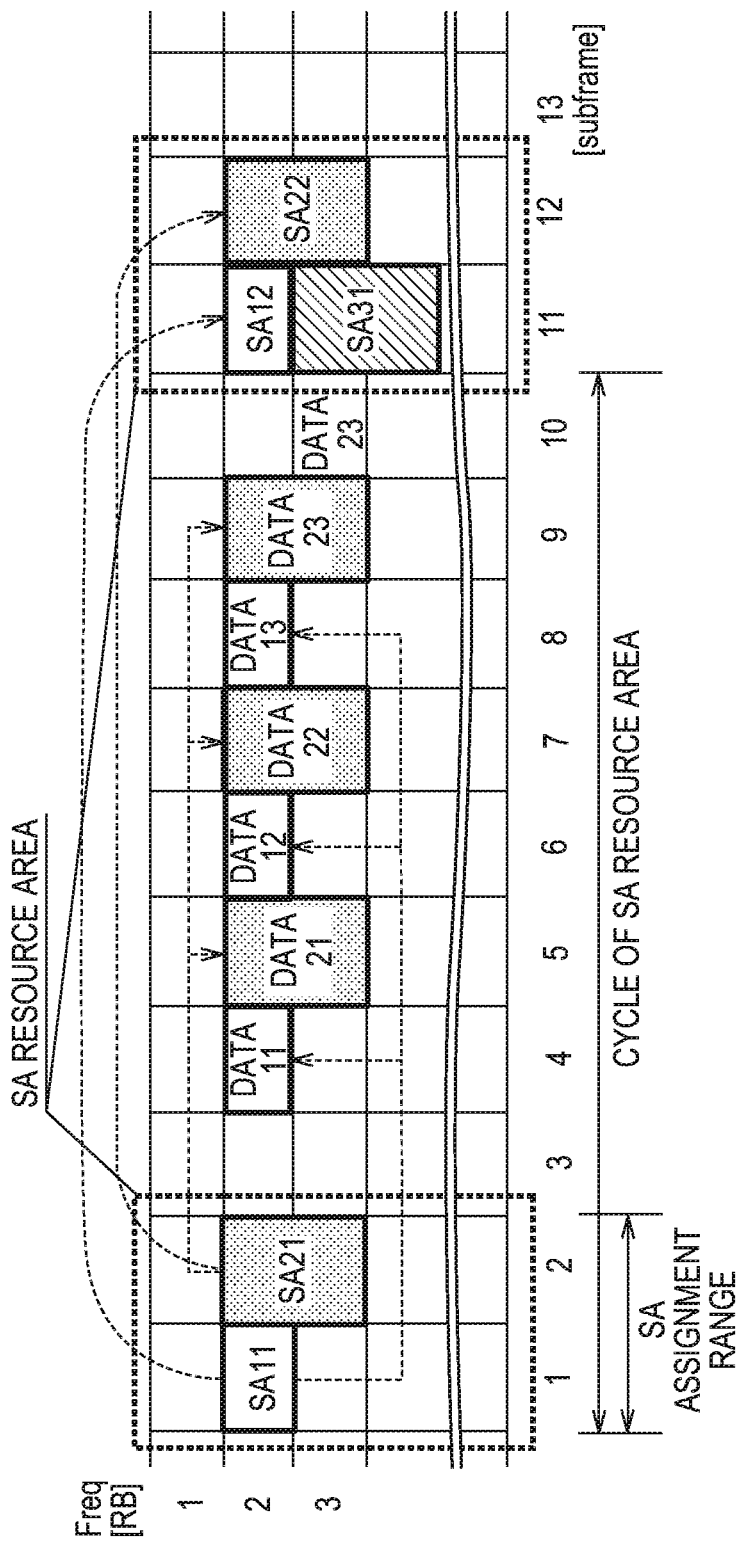
FIG. 10 is a configuration diagram of a radio frame for illustrating an operation example 1.

An operation example 1 will be described using FIG. 10. FIG. 10 is a configuration diagram of a radio frame for illustrating the operation example 1.

The operation example 1 is a case in which the range of an SA resource in this cycle is limited depending on the locations of SA resources in a previous cycle.

As shown in FIG. 10, the SA resource area is periodically provided in a time axis direction.

When the UE 100 wants to transmit the D2D communication data, the UE 100 performs a scan within the SA resource area before starting the decision regarding the SA resources. Next, the UE 100 decides the SA resources in the next cycle depending on the locations of the SA resources in a previous cycle. Specifically, the UE 100 decides the SA resources in the next cycle on the basis of the unused SA resources within the scanned SA resource area.

Specifically, as shown in FIG. 10, the UE 100 receives SA 11 and SA 21 by scanning the SA resource area. The UE 100 decides, as SA resources, the resources at the locations of (subframe 11, RB 3-4) by avoiding the locations of the SA 11 and the SA 21. The UE 100 uses the decided SA resources to transmit SA 31.

According to the operation example 1, since the UE 100 is capable of grasping the locations of the next SAs of another UE 100 when the other UE 100 is continuously transmitting SAs, it is possible to effectively scan the SAs. In addition, since the UE 100 is capable of deciding the SA resources by avoiding the locations of the SAs of the other UE 100, it is possible to avoid the collision of SAs.

It is noted that as shown in FIG. 10, the range of the data resource area may be limited depending on the locations of the SAs. Specifically, the range of the data resource area is limited so that the locations of the SAs and the location of the data are in the same frequency band.

(B) Modification of Operation Example 1

Figure 11:
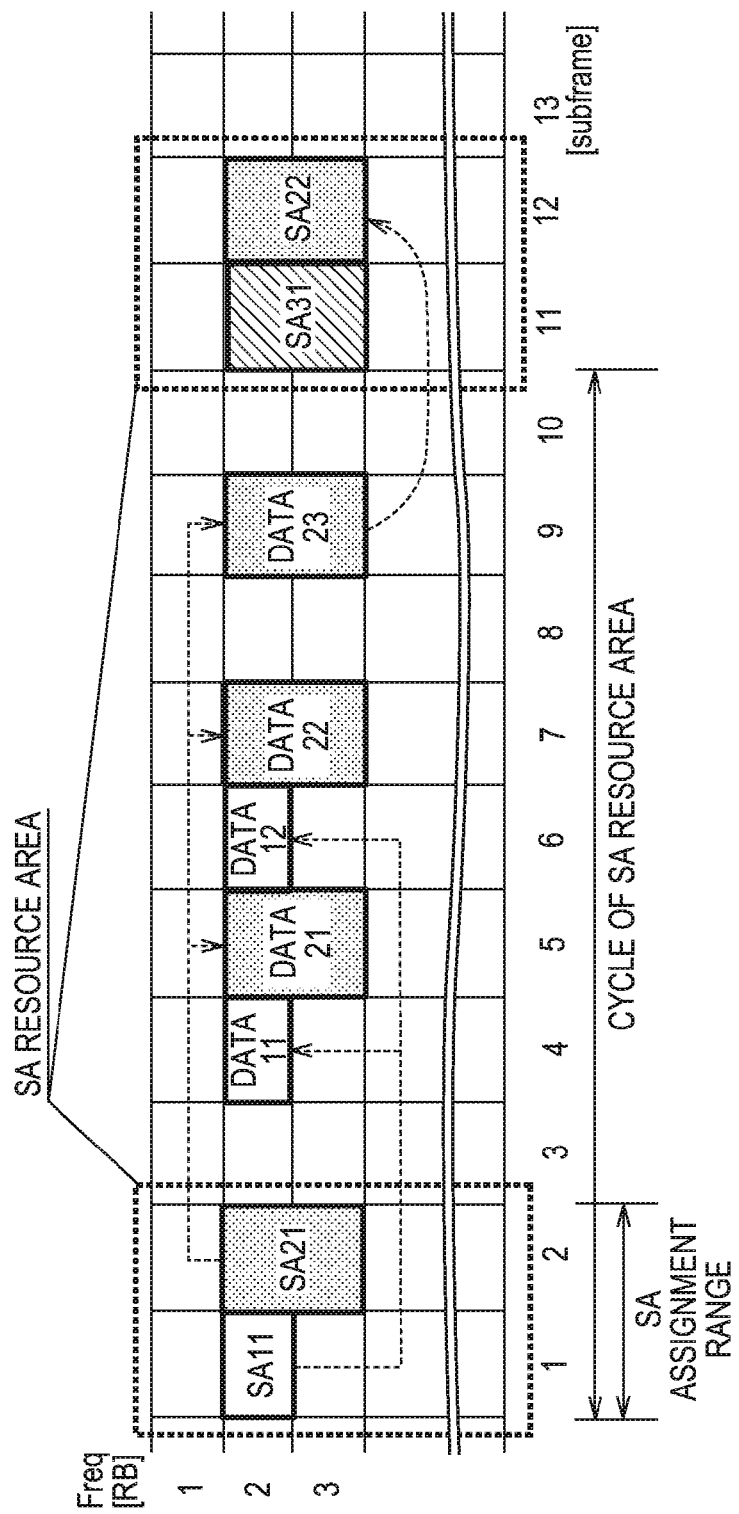
FIG. 11 is a configuration diagram of a radio frame for illustrating a modification of the operation example 1.

Next, a modification of the operation example 1 will be described by using FIG. 11. FIG. 11 is a configuration diagram of a radio frame for illustrating a modification of the operation example 1.

In the operation example 1, the UE 100 scans the SA resource area, but in the modification of the operation example 1, the UE 100 scans the data resource area.

As shown in FIG. 11, the SA resource area is periodically provided in a time axis direction. As a result, the data resource area is partitioned into SA resource areas and periodically provided in a time axis direction.

Moreover, in addition to the fact that the range of the SA resources in a next cycle is limited depending on the locations of SA resources in a previous cycle, the range of the data resource area is limited depending on the locations of the SA resources.

When the UE 100 wants to transmit the D2D communication data, the UE 100 performs a scan within the data resource area before starting the decision regarding the SA resources. Next, the UE 100 presumes the SA resources that should indicate the unused data resources on the basis of the unused data resources within the scanned data resource area. The UE 100 uses the fact that the range of a data resource is limited depending on a location of an SA resource to assume the SA resources. The UE 100 decides the SA resources in the next cycle on the basis of the assumed SA resources.

Specifically, as shown in FIG. 11, the UE 100 grasps the fact that the data resource at the location of (subframe 8) is an unused data resource based on the scanning of the data resource area (subframes 3-10). The UE 100 assumes the SA resources that should indicate the unused data resources on the basis of the configuration information or the like. On the basis of the configuration information or the like, the UE 100 assumes that the SA 11 is the SA that should indicate the location of the unused data resources. The UE 100 assumes that the SA resource at the location corresponding to the location of the SA 11 in the next cycle (subframe 11) is not used. Thus, the UE 100 transmits the SA 31 using the SA resource at the location (subframe 11, RB 2-3).

It is noted that rather than scanning the entire data resource area, the UE 100 may scan only the area of a subframe 8-9 from where the last D2D communication data is transmitted. Alternatively, when the number of data resources indicated by SA is less than the maximum number of the transmitted D2D communication data on the basis of the configuration information or the like, the UE 100 may decide the SA resources in the next cycle depending on the location of the SA resources used for transmitting the SA.

According to the modification of the operation example 1, similarly to the operation example 1, since it is possible to grasp the locations of the next SAs of another UE 100, it is possible to effectively scan the SAs. Moreover, it is possible to avoid the collision of SAs.

(C) Operation Example 2

An operation example 2 will be described. In the operation example 2, the UE 100 calculates the range of the SA resource area on the basis of a unique value of the UE 100.

For example, the UE 100 decides the range of the SA resource area (the SA resources) by the following Equation, on the basis of a random number, a UE-unique value, and the number of SA resources.

Range of SA resource area=(*Rand*(UE−unique value))mod number of SA resources

The UE-unique value, for example, is a manufacturing number or a telephone number, etc.

The UE 100 decides the SA resources on the basis of the calculated range of the SA resource area.

Moreover, the UE 100 may decide the range of the SA resource area by the following Equation.

Range of SA resource area=(*Rand*(UE−unique value×time))mod number of SA resources The time, for example, is the time point of calculating the range of the SA resource area.

According to the operation example 2, since the SA resources are selected randomly, it is possible to prevent the SA resources from being unevenly selected. As a result, it is possible to avoid the collision of SAs.

(D) Operation Example 3

Figure 12:
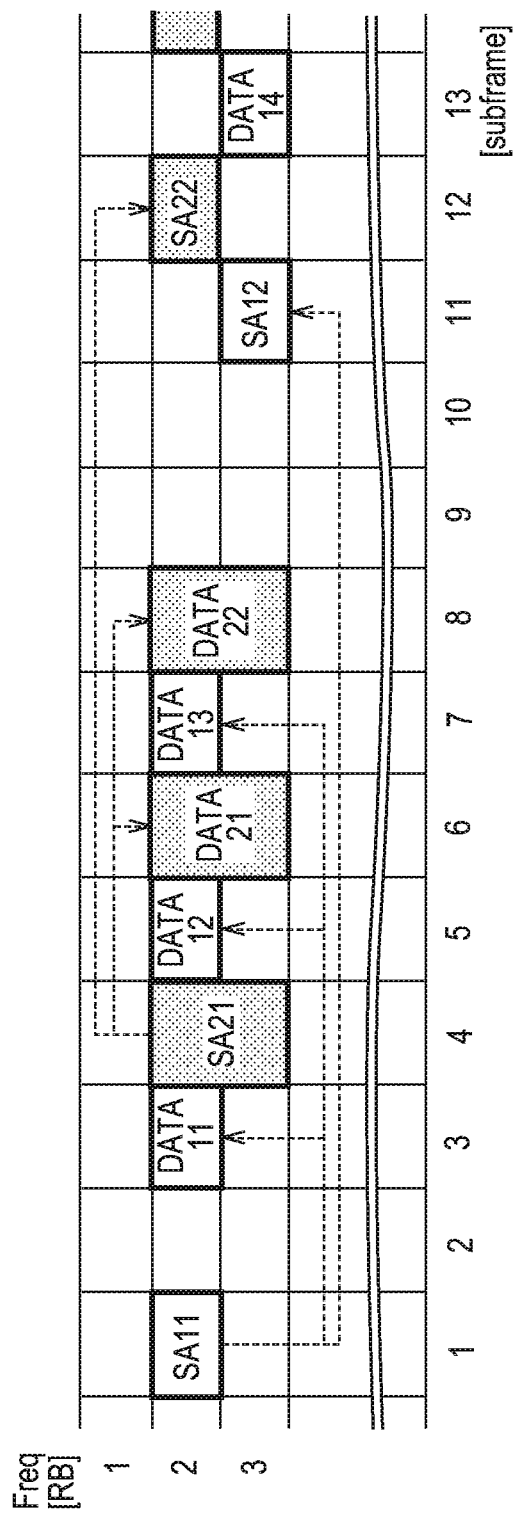
FIG. 12 is a configuration diagram of a radio frame for illustrating an operation example 3.

An operation example 3 will be described using FIG. 12. FIG. 12 is a configuration diagram of a radio frame for illustrating the operation example 3.

In the operation example 3, along with indicating a location of the data resources in the same cycle, the SA indicates a location of an SA resource indicating the location of the next data resources.

The UE 100 decides the location of a data resource, and the location of an SA resource indicating the location of the data resource. The UE 100 further decides the location of an SA resource in a next cycle. The UE 100 uses the decided SA resource to transmit the location of the decided data resource, and the SA indicating the location of the SA resource in the next cycle.

For example, as shown in FIG. 12, the UE 100-1 transmits the SA 11 that indicates the location of data resources DATA 11 to DATA 13, and also indicates the location of a SA resource SA 12.

Here, it is assumed that the possibility of assigning three DATAs after two [subframes] in cycles of two [subframes] for the SA is defined in the configuration information or the like.

The UE 100-2 understands the location of the data resources (DATAs 11 to 13) used by the UE 100-1 that transmits the SA 11, on the basis of the SA 11. The UE 100-2 decides the SA 21 on the basis of the location of the data resources indicated by the SA 11.

It is noted that the UE 100-2, for example, may transmit the SA 21 using only the SA resource at the location (subframe 4, RB 2). In such a case, since the size of the SA is different from the size of the D2D communication data, the SA 21 may include information indicating that the size of the D2D communication data extends in a frequency direction from the size of the SA.

According to the operation example 3, since the reservation of the next SA resource is possible, the UE 100 is capable of deciding the SA resources by avoiding the location of the reserved SA resource. As a result, it is possible to avoid the collision of SAs.

(E) Operation Example 4

Figure 13:
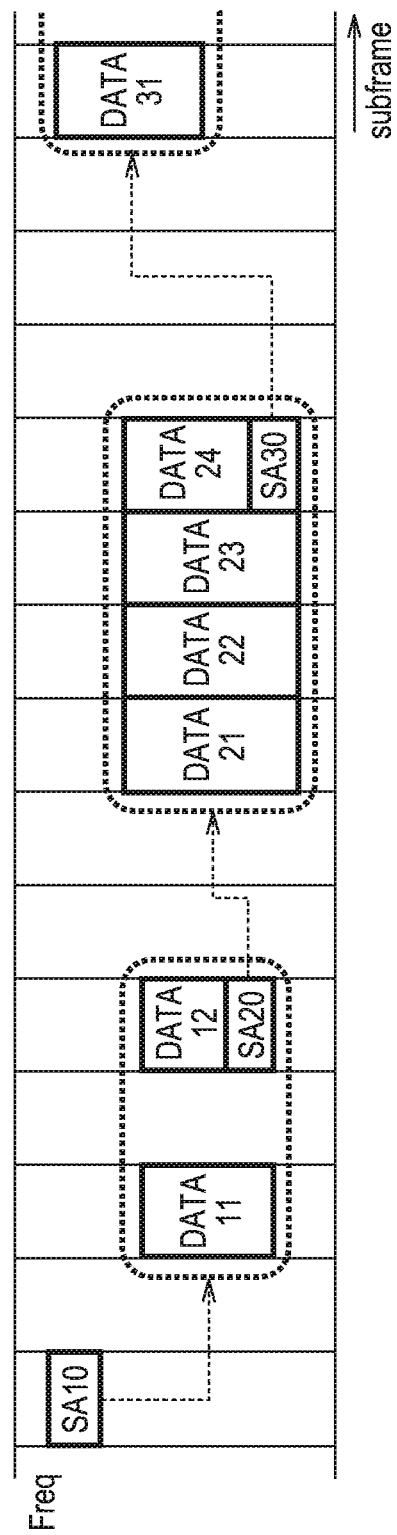
FIG. 13 is a configuration diagram of a radio frame for illustrating an operation example 4.
Figure 14:
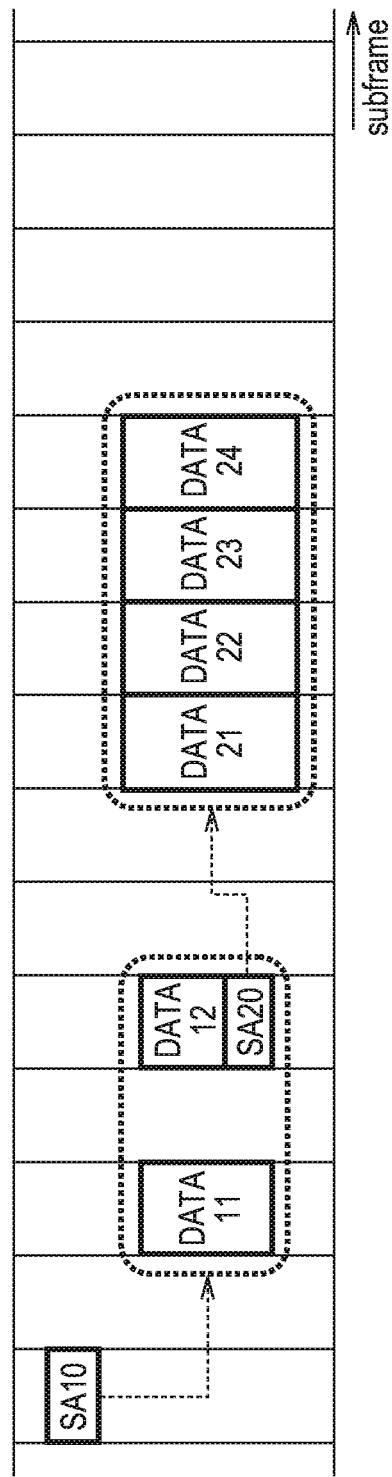
FIG. 14 is a configuration diagram of a radio frame for illustrating the operation example 4.
Figure 15:
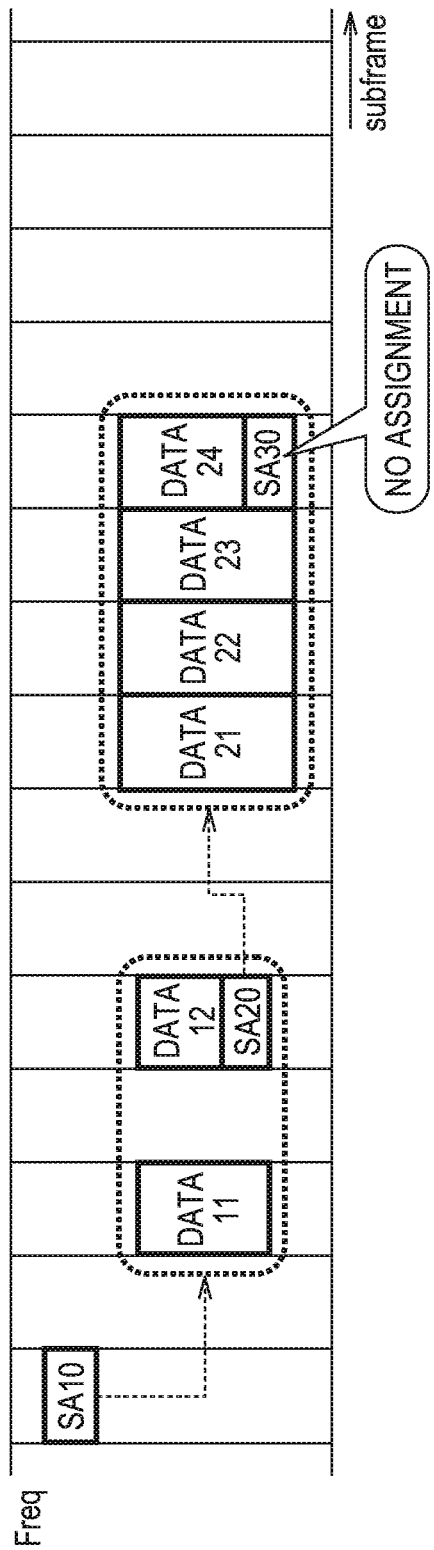
FIG. 15 is a configuration diagram of a radio frame for illustrating the operation example 4.

An operation example 4 will be described using FIG. 13 to FIG. 15. FIG. 13 to FIG. 15 are configuration diagrams of a radio frame for illustrating the operation example 4.

In the operation example 4, the UE 100 uses the data resources to transmit the SA indicating the location of the data resources in the next cycle along with the D2D communication data.

Specifically, as shown in FIG. 13, the UE 100 uses the SA resource to transmit SA 10 indicating the location of the data resources (the range of the data resources). Thereafter, the UE 100 uses the data resources to transmit the DATA 11, the DATA 12, and SA 20.

Moreover, the UE 100 transmits the SA 20 immediately after the last DATA 12 using the data resources. The SA 20 is transmitted using the last data resource of a series of data resources indicated by the SA 10. In other words, the SA 20 is arranged in an area following the area in which the last DATA 12 is arranged (the last resource block of the last data resource) among the data resources divided in a plurality of areas (the area of the DATA 11, the area of the DATA 12, and the area of the SA 20). Therefore, it is possible to acquire the SA after the series of D2D communication data has been received.

The location of the SA 20 may be a predetermined location (for example, the last resource block of the last data resource). Alternatively, the UE 100 may dynamically set the location of the SA 20, and transmit the SA 10 indicating the location of the data resources and the location of the SA 20.

As shown in FIG. 14, the UE 100 may indicate that when ending transmitting the D2D communication data, transmitting the D2D communication data is ended by not transmitting the SA using data resources.

Alternatively, as shown in FIG. 15, the UE 100 may transmit SA 30 indicating information (no assignment) that indicates the termination of transmitting the D2D communication data using data resources.

According to the operation example 4, since another UE 100 is capable of receiving the SA by scanning the data resources indicated by the SA, it is possible to effectively scan the SAs.

(F) Modification 1 of Operation Example 4

Figure 16:
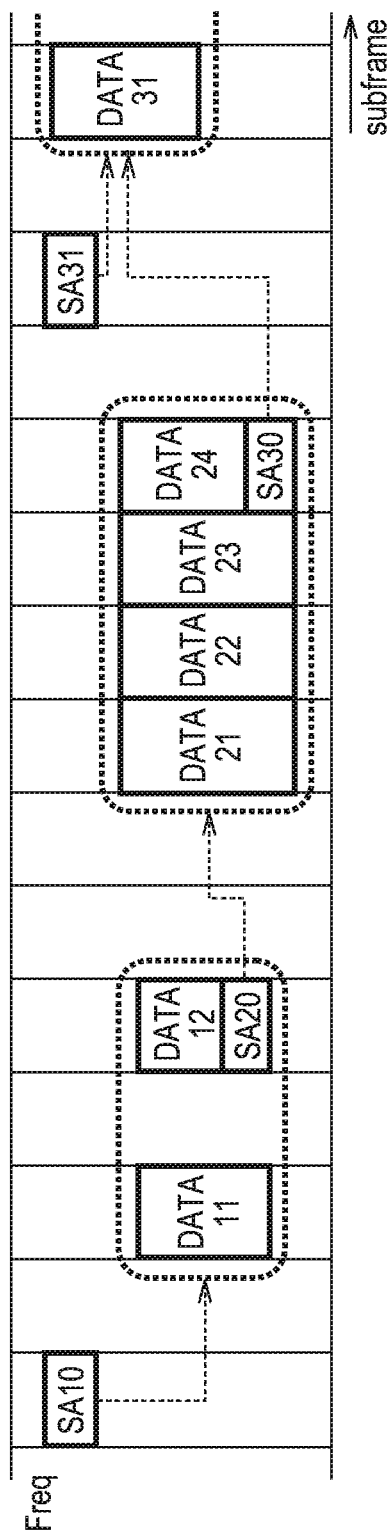
FIG. 16 is a configuration diagram of a radio frame for illustrating a modification 1 of the operation example 4.
Figure 17:
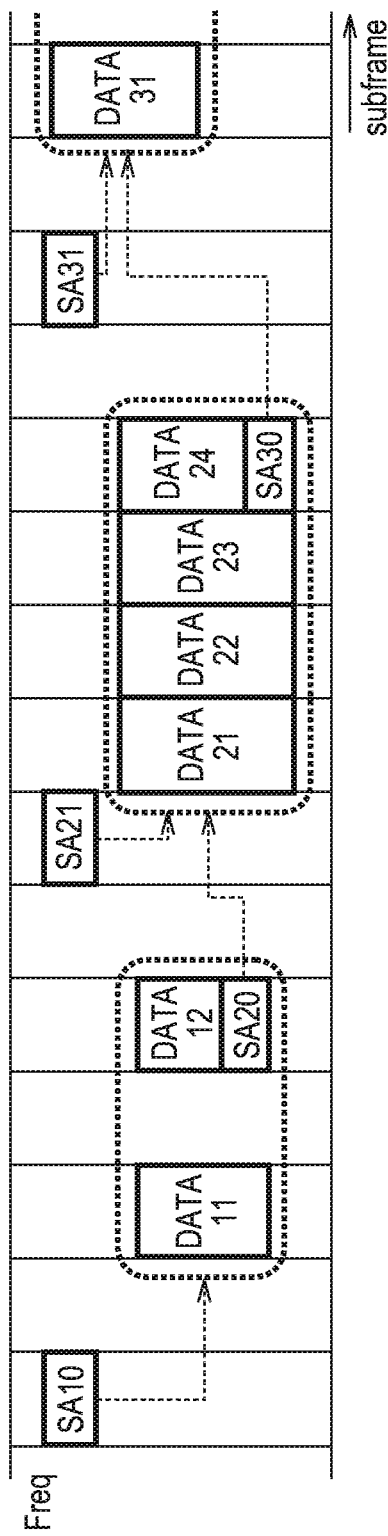
FIG. 17 is a configuration diagram of a radio frame for illustrating the modification 1 of the operation example 4.

Next, a modification 1 of the operation example 4 will be described by using FIG. 16 to FIG. 18. FIG. 16 and FIG. 17 are configuration diagrams of a radio frame for illustrating the modification 1 of the operation example 4. FIG. 18 is a diagram for illustrating SIB according to the modification 1 of the operation example 4.

In the modification 1 of the operation example 4, in addition to providing an SA resource within a data resource, the UE 100 periodically provides an SA resource outside the data resource.

For example, as shown in FIG. 16, the UE 100 transmits the SA in which the SA resource that is outside the data resource is used, in a cycle (12 [subframes] cycle) that is longer than the transmission cycle of the series of D2D communication data. Alternatively, as shown in FIG. 17, the UE 100 transmits the SA in which the SA resource that is outside the data resource is used, in a cycle (six [subframes] cycle) that is same as the transmission cycle of the series of D2D communication data.

The UE 100 may decide, on the basis of a UE identifier (such as C-RNTI), the transmission cycle (transmission interval) of the SA in which the SA resource is used. The UE identifier, for example, is C-RNTI, a part of C-RNTI (for example, the last two digits), or a predetermined and dedicated identifier (such as Public-Safety dedicated ID).

Specifically, the UE 100 may be decided using the following Equation.

Transmission interval=(UE identifier)mod(configuration value)×$n$

The UE 100 may set the configuration value and n on the basis of the configuration information, or the UE 100 may set the configuration value and n on the basis of a candidate of the configuration value received by SIB (see FIG. 18). Moreover, the UE 100 may use a value that is set in a fixed manner in SIM, etc. to set the configuration value and n. Alternatively, the UE 100 may set the configuration value and n depending on the application that is used in the D2D communication.

Moreover, as a transmission mode applied to transmitting SA, the UE 100 is capable of selecting the transmission mode of the operation example 4 or the transmission mode of the modification 1 of the operation example 4, for example, depending on the application used in the D2D communication. Specifically, when the application used in the D2D communication is an application for real-time communication or mission-critical communication (such as an emergency call or a preferred call), the UE 100 selects the transmission mode of the modification 1 of the operation example 4; otherwise the UE 100 selects the transmission mode of the operation example 4.

According to the modification 1 of the operation example 4, since a plurality of SAs indicating the location of the same data resource are transmitted, the UE 100 need not scan an SA that is transmitted using an SA resource as long as it is possible to receive SAs transmitted using a data resource. Therefore, it is possible to effectively scan the SAs. Moreover, even in the case of failure in receiving an SA transmitted using a data resource, it is possible to more accurately receive the D2D communication data by performing a scan of the SAs transmitted using an SA resource.

(G) Modification 2 of Operation Example 4

Figure 19:
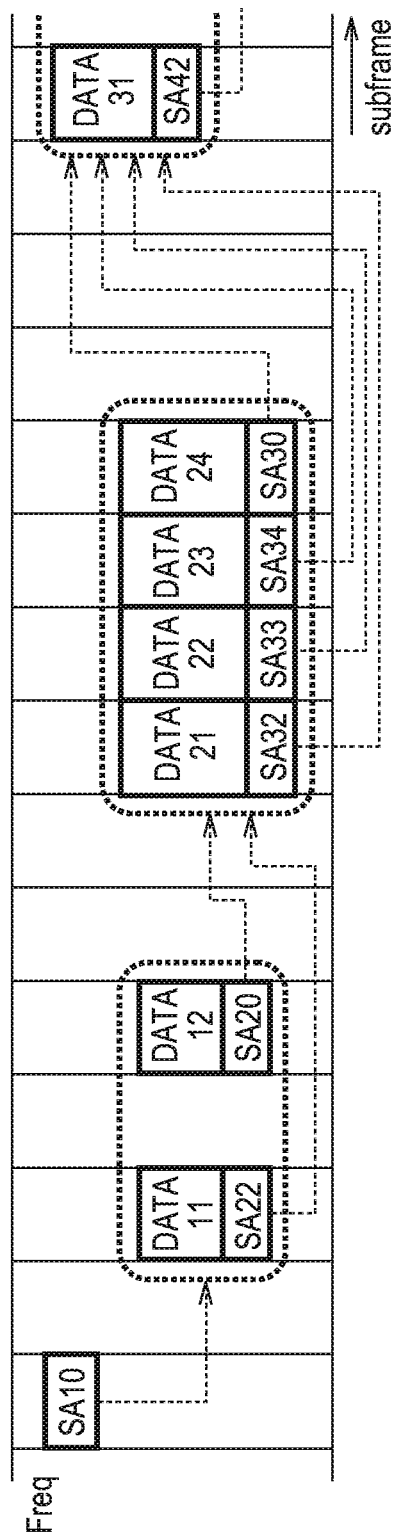
FIG. 19 is a configuration diagram of a radio frame for illustrating a modification 2 of the operation example 4.

A modification 2 of the operation example 4 will be described by using FIG. 19. FIG. 19 is a configuration diagram of a radio frame for illustrating the modification 2 of the operation example 4.

In the modification 2 of the operation example 4, when a data resource is divided into a plurality of small data resources, the UE 100 transmits the same SA (with the same contents) using each of the plurality of small data resources.

For example, as shown in FIG. 19, the data resource indicated by the SA 10 is divided into a data resource used for transmitting the DATA 11, and a data resource used for transmitting the DATA 12. The UE 100 uses the plurality of small data resources to transmit the SA 22 accompanied by the DATA 11, and the SA 20 accompanied by the DATA 12. Each of the SA 22 and the SA 20 indicate the location of the next data resources.
Similarly, each of the plurality of SAs (SA 32, SA 33, SA 34, and the SA 30) transmitted using the next data resources indicates the location of the further next data resources.

It is noted that rather than accompanying each of the plurality of SAs at the end of DATA, the UE 100 may accompany the DATA to each of the plurality of SAs. It is noted that the same is applicable in another operation example as well.

Moreover, as a transmission mode applied to transmitting SA, the UE 100 is capable of selecting the transmission mode of the operation example 4 or the transmission mode of the modification 2 of the operation example 4, for example, depending on the application used in the D2D communication. Specifically, when the application used in the D2D communication is an application for a file transfer, the UE 100 selects the transmission mode of the modification 2 of the operation example 4; otherwise the UE 100 selects the transmission mode of the operation example 4.

According to the modification 2 of the operation example 4, it is possible to more accurately receive the SAs as compared to the operation example 1.

(H) Modification 3 of Operation Example 4

Figure 20:
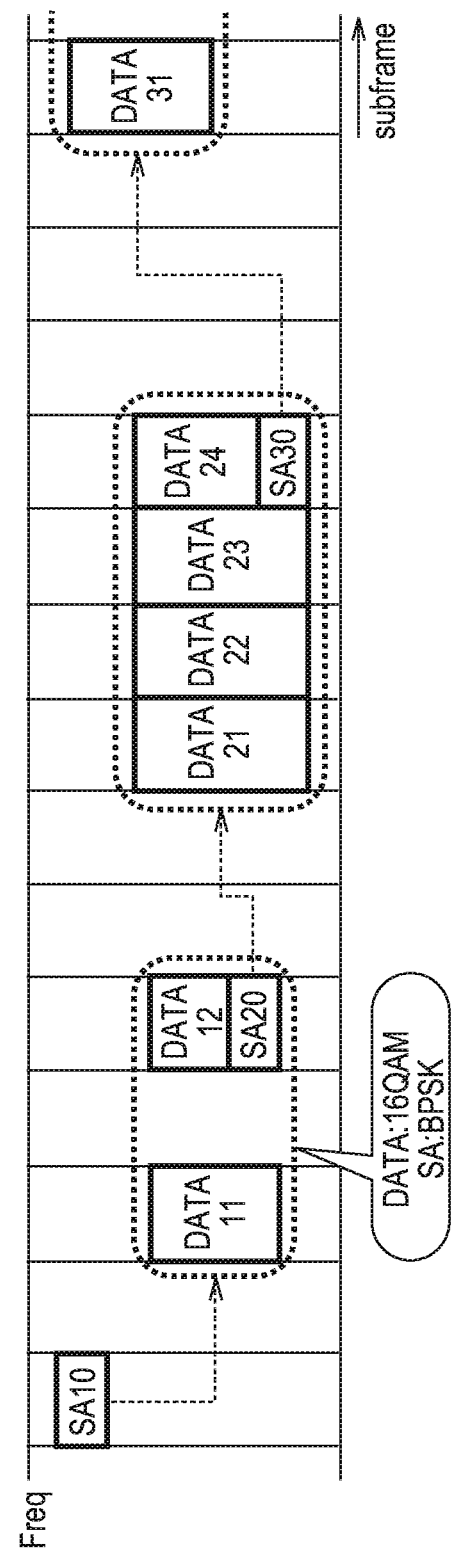
FIG. 20 is a configuration diagram of a radio frame for illustrating a modification 3 of the operation example 4.

A modification 3 of the operation example 4 will be described by using FIG. 20. FIG. 20 is a configuration diagram of a radio frame for illustrating the modification 3 of the operation example 4.

In the modification 3 of the operation example 4, in a data resource, the UE 100 applies, to the SAs, MCS (modulation and coding scheme) having an error resilience that is higher than MCS applied to the D2D communication data.

For example, in the operation example 4, the UE 100 applies 16QAM to the DATA and the SA transmitted using the data resource indicated by the SA. In contrast, in the modification of the operation example 4, as shown in FIG. 20, the UE 100 applies 16QAM to the DATA (the DATA 11 and the DATA 12) transmitted using the data resource indicated by the SA 10, and applies BPSK, which has a higher error resilience than 16QAM, to the SA 20 transmitted using the data resource indicated by the SA 10.

Moreover, as a transmission mode applied to transmitting SA, the UE 100 is capable of selecting the transmission mode of the operation example 4 or the transmission mode of the modification 3 of the operation example 4, for example, depending on the application used in the D2D communication. Specifically, when the application used in the D2D communication is an application for a file transfer, the UE 100 selects the transmission mode of the modification 3 of the operation example 4; otherwise the UE 100 selects the transmission mode of the operation example 4.

According to the modification 2 of the operation example 4, it is possible to more accurately receive the SAs as compared to the operation example 1.

(I) Modification 4 of Operation Example 4

Figure 21:
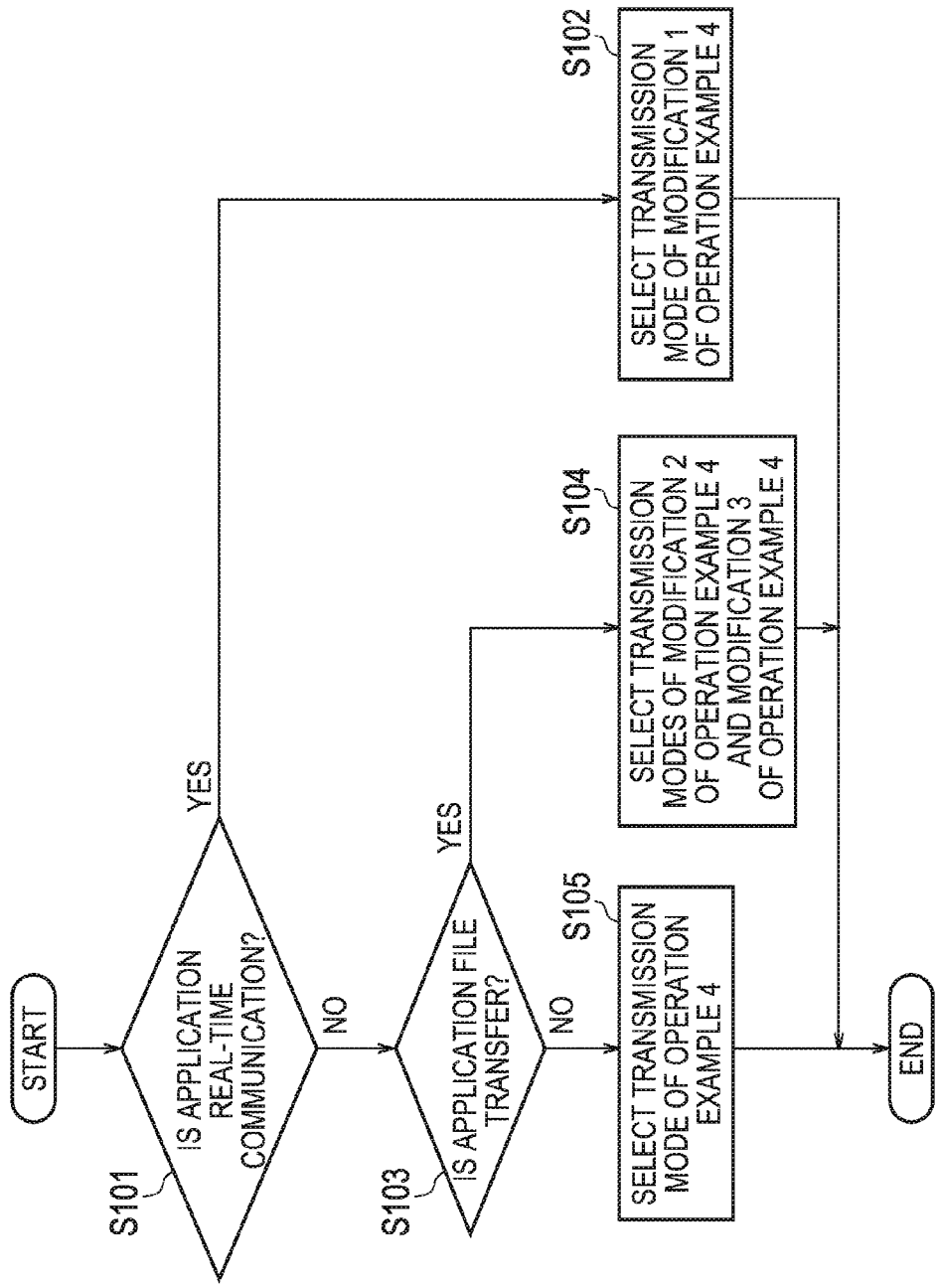
FIG. 21 is a flowchart for illustrating a modification 4 of the operation example 4.

A modification 4 of the operation example 4 will be described by using FIG. 21. FIG. 21 is a flowchart for illustrating the modification 4 of the operation example 4.

In the modification 4 of the operation example 4, a plurality of types of transmission modes having different methods of improving the error resilience of SA are defined. The UE 100 selects a transmission mode to be applied to transmitting SAs from among a plurality of types of transmission modes depending on the application used in the D2D communication.

As shown in FIG. 21, in step S101, before starting transmitting the SA, the UE 100 determines whether the application used in the D2D communication is an application for real-time communication (or mission-critical communication). When the application is an application for the real-time communication, the UE 100 executes the process of step S102; otherwise the UE 100 executes the process of step S103.

In step S102, the UE 100 selects the transmission mode by which an SA resource is periodically provided outside the data resource (the modification 1 of the operation example 4).

In step S103, the UE 100 determines whether the application used in the D2D communication is an application for a file transfer. When the application is an application for a file transfer, the UE 100 executes the process of step S104; otherwise the UE 100 executes the process of step S105.

In step S104, the UE 100 selects the transmission mode for transmitting the same SA using each of a plurality of small data resources (the modification 2 of the operation example 4), and the transmission mode for applying MCS with a high error resilience to the SA (the modification 3 of the operation example 4).

In step S105, the UE 100 selects the transmission mode in which the error resilience of the SA is normal (the operation example 4).

According to the modification 4 of the operation example 4, the UE 100 is capable of selecting a transmission mode in which the error resilience of the SA is appropriate depending on the application used in the D2D communication.

(J) Operation Example 5

Figure 22:
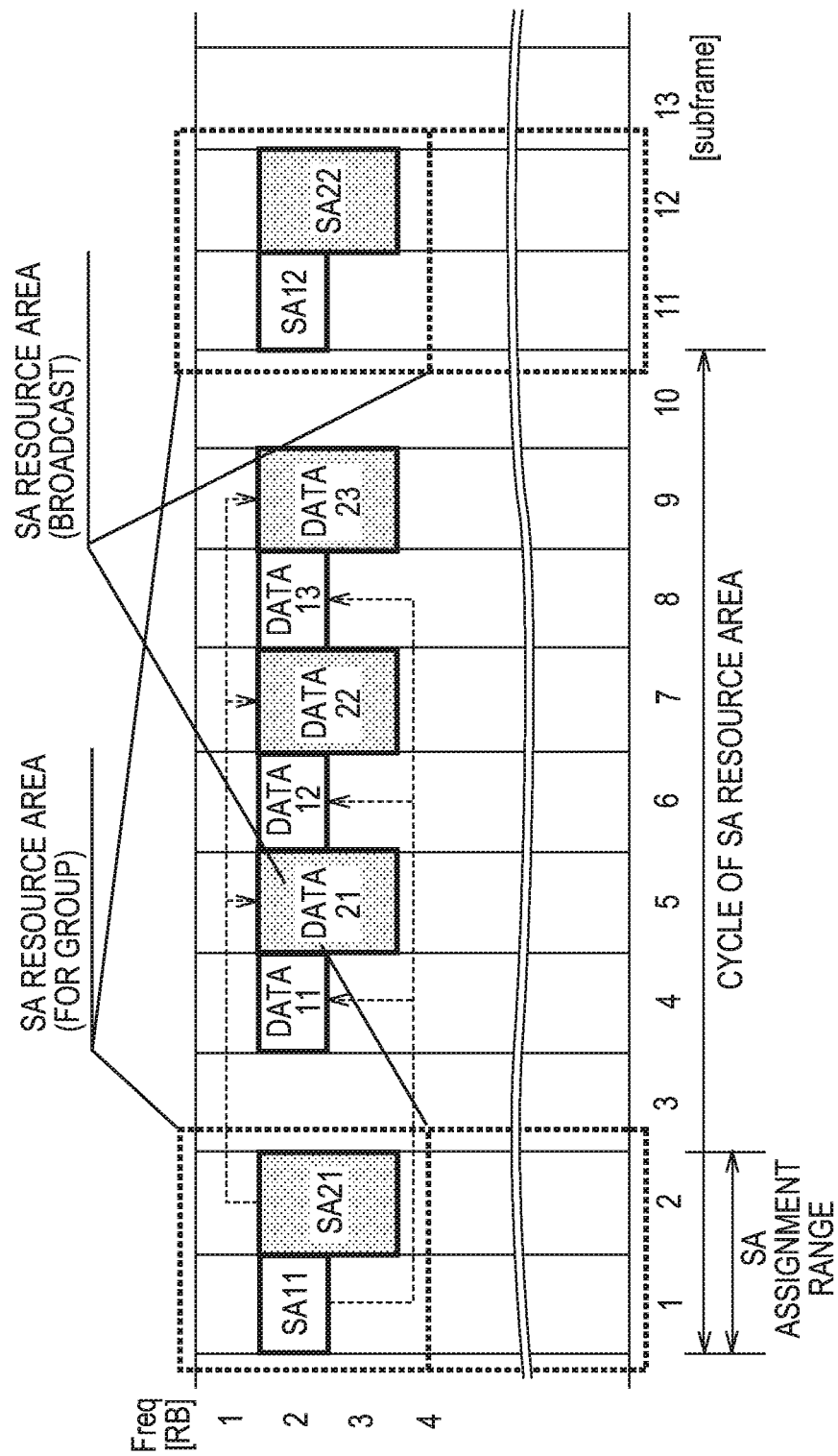
FIG. 22 is a configuration diagram of a radio frame for illustrating an operation example 5.
Figure 23:
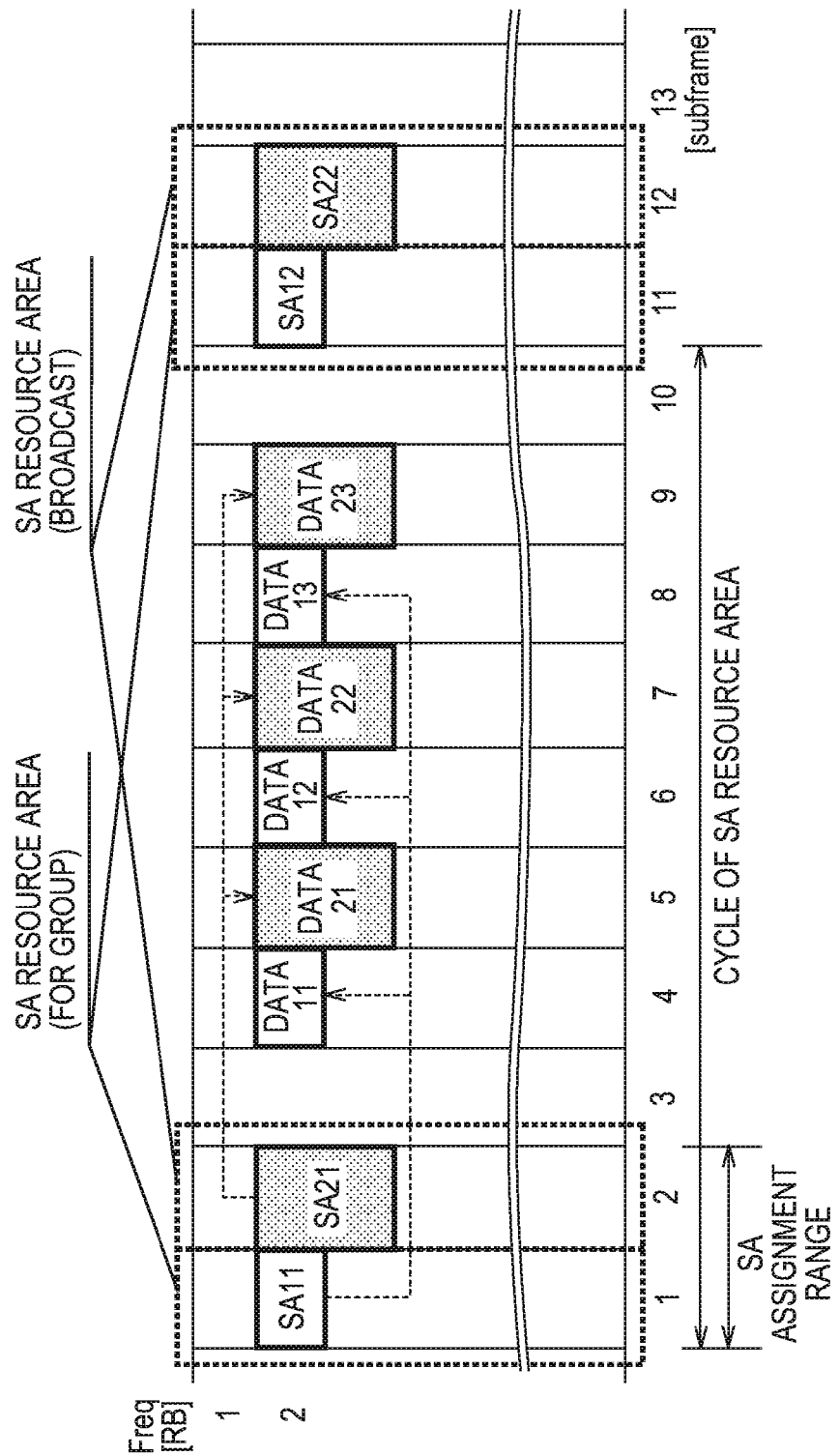
FIG. 23 is a configuration diagram of a radio frame for illustrating the operation example 5.

An operation example 5 will be described using FIG. 22 and FIG. 23. FIG. 22 and FIG. 23 are configuration diagrams of a radio frame for illustrating the operation example 5.

In the operation example 5, an SA resource area for a D2D group is provided.

As shown in FIG. 22, the SA resource area includes an SA resource area for a D2D group (a D2D group area) and an SA resource area for broadcast (a broadcast area).

In the D2D group area, an SA resource for a plurality of UEs 100 configuring a D2D group are provided. In the broadcast area, an SA resource for an unspecified UE 100 is provided.

As shown in FIG. 22, the D2D group area and the broadcast area may be separated in a frequency direction. Alternatively, as shown in FIG. 23, the D2D group area and the broadcast area may be separated in a time axis direction. Specifically, the D2D group area and the broadcast area may be separated for each frame.

As shown in FIG. 22, when transmitting SA to the UEs 100 configuring the D2D group, the UE 100 transmits the SA using the SA resource within the D2D group area. On the other hand, when transmitting SA to an unspecified UE 100, the UE 100 transmits the SA using the SA resource within the broadcast area.

Moreover, the UE 100 shares an SA resource area (the SA resources of the SA 11 and the SA 12) dedicated to a D2D group 1, to which the UE 100 belongs, with the plurality of UEs 100 configuring the D2D group 1. Other plurality of UEs 100 configuring another D2D group 2 shares the SA resource area (the SA resources of the SA 21 and the SA 22) dedicated to the D2D group 2. In other words, the UEs 100 belonging to the D2D group 1 are prohibited from using the SA resources of the other D2D group 2. Thus, due to the assignment of a dedicated SA resource area to each of the D2D groups, it is possible to avoid the collision of SAs by different D2D groups. In addition, as shown in FIG. 22, the SA resource area dedicated to the D2D group is provided at a corresponding location in a next cycle.

In order to avoid a collision of the SAs within the D2D group 1, the UE 100 transmits SA after detecting the end of a transmission of the D2D communication data of another UE 100 belonging to the D2D group 1. When information indicating that transmitting the D2D communication data is ended (temporarily) is included in the SA or the D2D communication data, the UE 100, for example, transmits the SA using the SA resource dedicated to the D2D group 1. It is needless to say that another method described herein may also be used.

According to the operation example 5, since the SA resource area includes the D2D group area and the broadcast area, the UE 100 is capable of selecting the SA resource area to be scanned depending on whether the partner terminal of the D2D communication is the UE 100 belonging to the D2D group. As a result, it is possible to effectively scan the SAs.

Moreover, the UE 100 shares the SA resource area dedicated to the D2D group 1, to which the UE 100 belongs, with the plurality of UEs 100 configuring the D2D group 1. As a result, it is possible to more effectively perform scanning of the SAs because the UEs 100 belonging to the D2D group 1 may scan only the SA resources being shared.

(K) Operation Example 6

Figure 24:
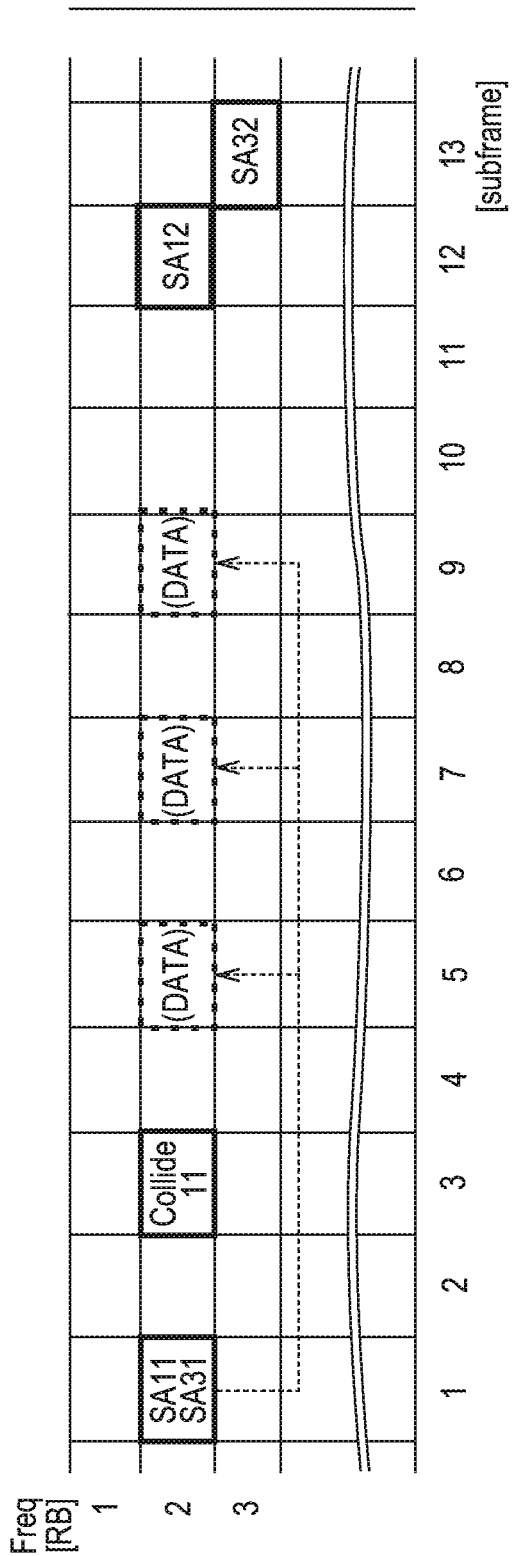
FIG. 24 is a configuration diagram of a radio frame for illustrating an operation example 6.
Figure 25:
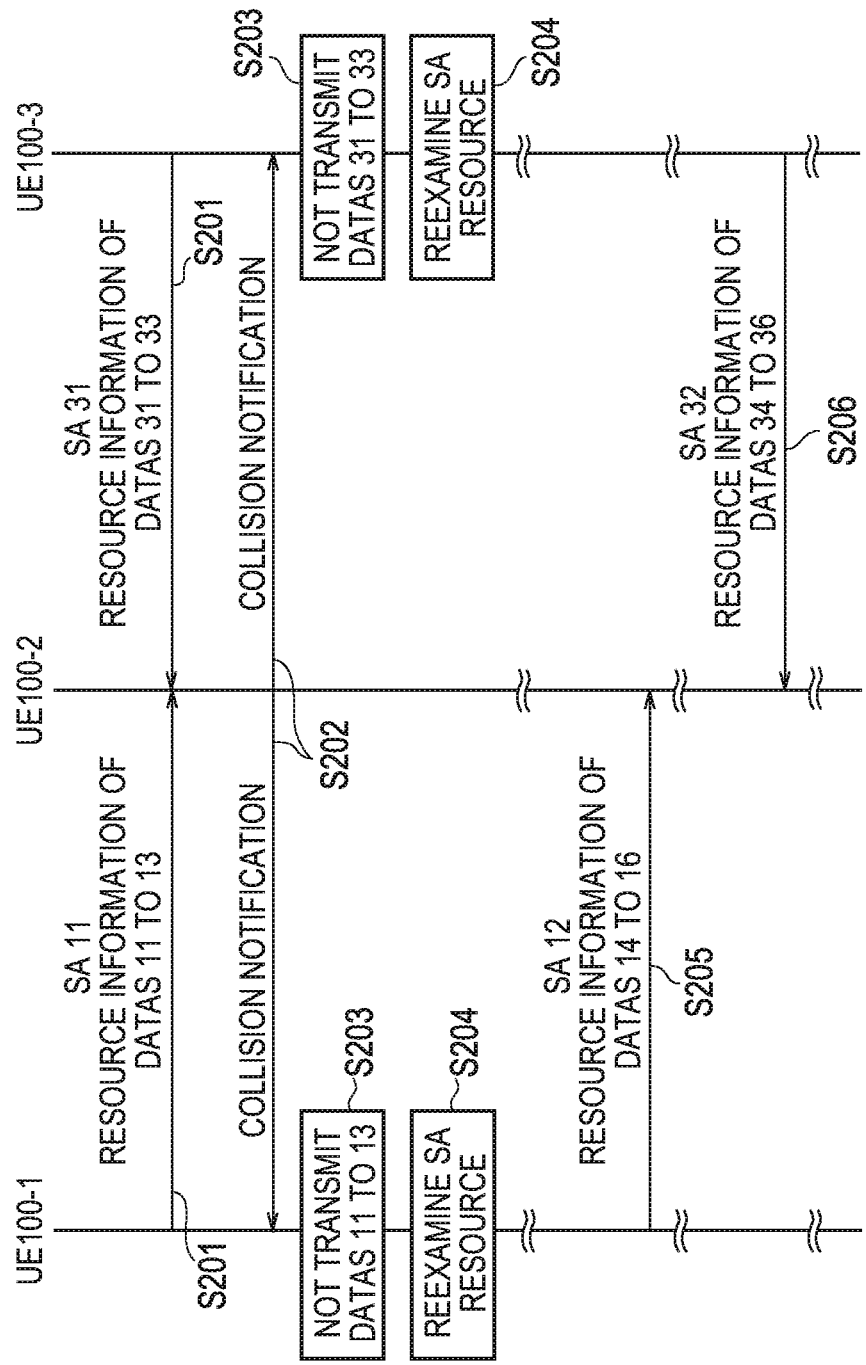
FIG. 25 is a sequence diagram for illustrating the operation example 6.

An operation example 6 will be described using FIG. 24 and FIG. 25. FIG. 24 is a configuration diagram of a radio frame for illustrating the operation example 6. FIG. 25 is a sequence diagram for illustrating the operation example 6.

In the operation example 6, when the UE 100-2 detects a collision of SAs as a result of scanning of the SAs, the UE 100-2 transmits collision information indicating a collision of SAs. On receiving the collision information, each of the UE 100-1 and the UE 100-2 examines a change in the location of the SA resources.

It is noted that the explanation is proceeded with assuming that each UE 100 is synchronized. Moreover, the explanation is proceeded with assuming that an SA resource area is provided periodically in the time axis, and the configuration information or the like defines that as a principle, each UE 100 that transmits the SA should transmit the SA by periodically using the SA resource at the same location.

As shown in FIG. 24 and FIG. 25, in step S201, each of the UE 100-1 and UE 100-3 transmits the SA 11 and the SA 31 using the same SA resources (subframes 1 and 2).

In step S202, upon detecting a collision of SA 11, the UE 100-2 transmits collision information (Collide 11). Regardless of the fact that the UE 100-2 detects a received power as a result of scanning of the SA resources, when an interpretation of the SA 11 fails, the UE 100-2 determines that a collision of SAs is detected.

Each of the UE 100-1 and the UE 100-3 that transmits the SAs monitors (scans) the time-frequency resource using which the collision information is transmitted. Each of the UE 100-1 and the UE 100-3 receives the collision information as a result of scanning.

In step S203, each of the UE 100-1 and the UE 100-3 aborts transmitting the D2D communication data (the DATAs 11 to 13, and DATAs 31 to 33).

In step S204, each of the UE 100-1 and the UE 100-3 thinks about a change in the location of the SA resources. For example, each of the UE 100-1 and the UE 100-3 determines whether to change the location of the SA resource (for example, the frequency band) on the basis of a random value.

The explanation is proceeded based on the fact that the UE 100-1 determines that the location of the SA resource is not changed, and the UE 100-3 determines that the location of the SA resource is changed. It is noted that the UE 100-3 decides the location (subframe 13, RB 3) as the SA resource.

In step S205, the UE 100-1 transmits the SA 12 indicating the location of the data resource of DATAs 14 to 16. The UE 100-2 receives the SA 12.

In step S206, the UE 100-3 transmits the SA 32 indicating the location of the data resource of DATAs 34 to 36. The UE 100-2 receives the SA 32.

According to the operation example 6, since the UE 100-1 and the UE 100-3 is capable of knowing a collision of SAs, it is possible to reduce the continuous collision of SAs.

(L) Modification of Operation Example 6

Figure 26:
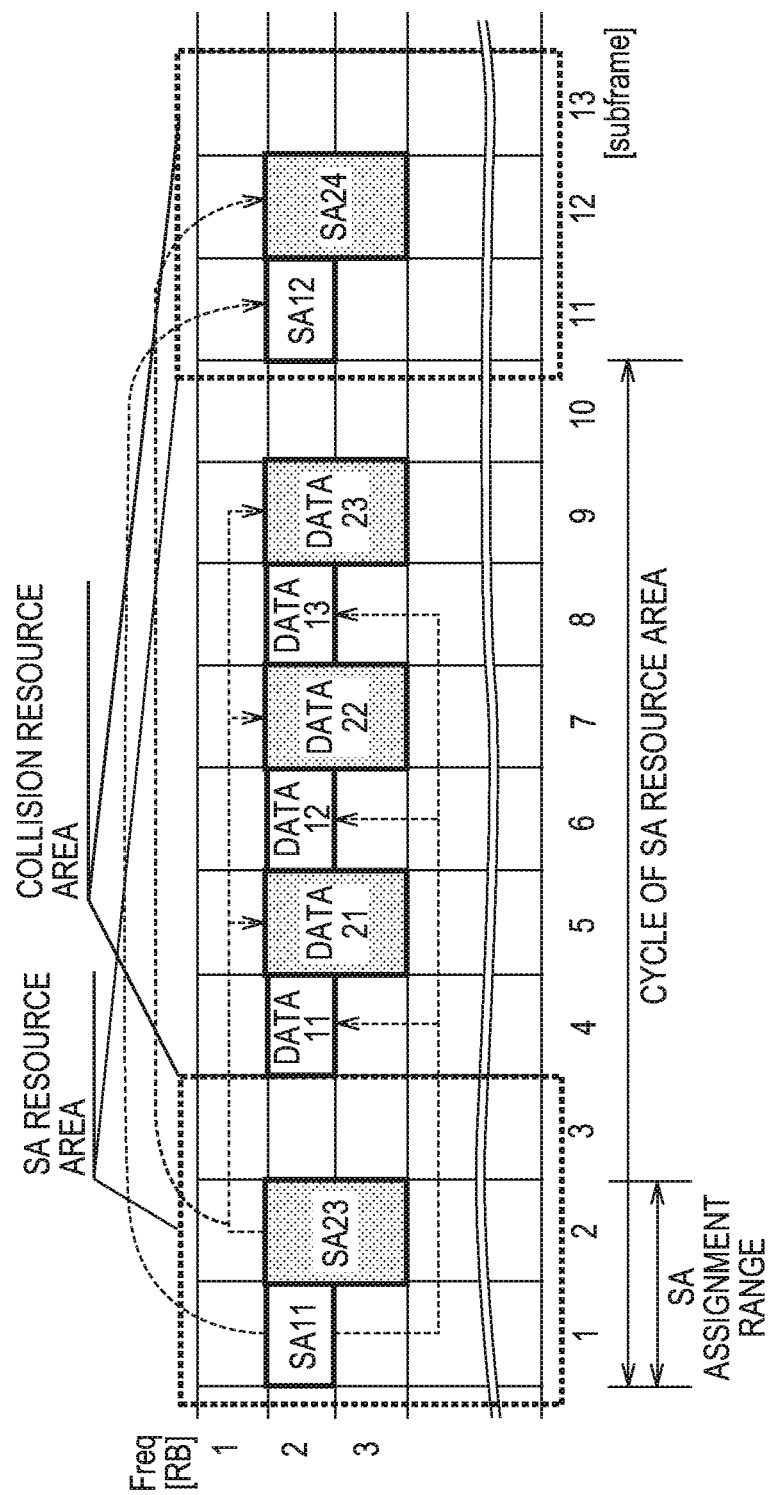
FIG. 26 is a configuration diagram of a radio frame for illustrating the operation example 6.
Figure 27:
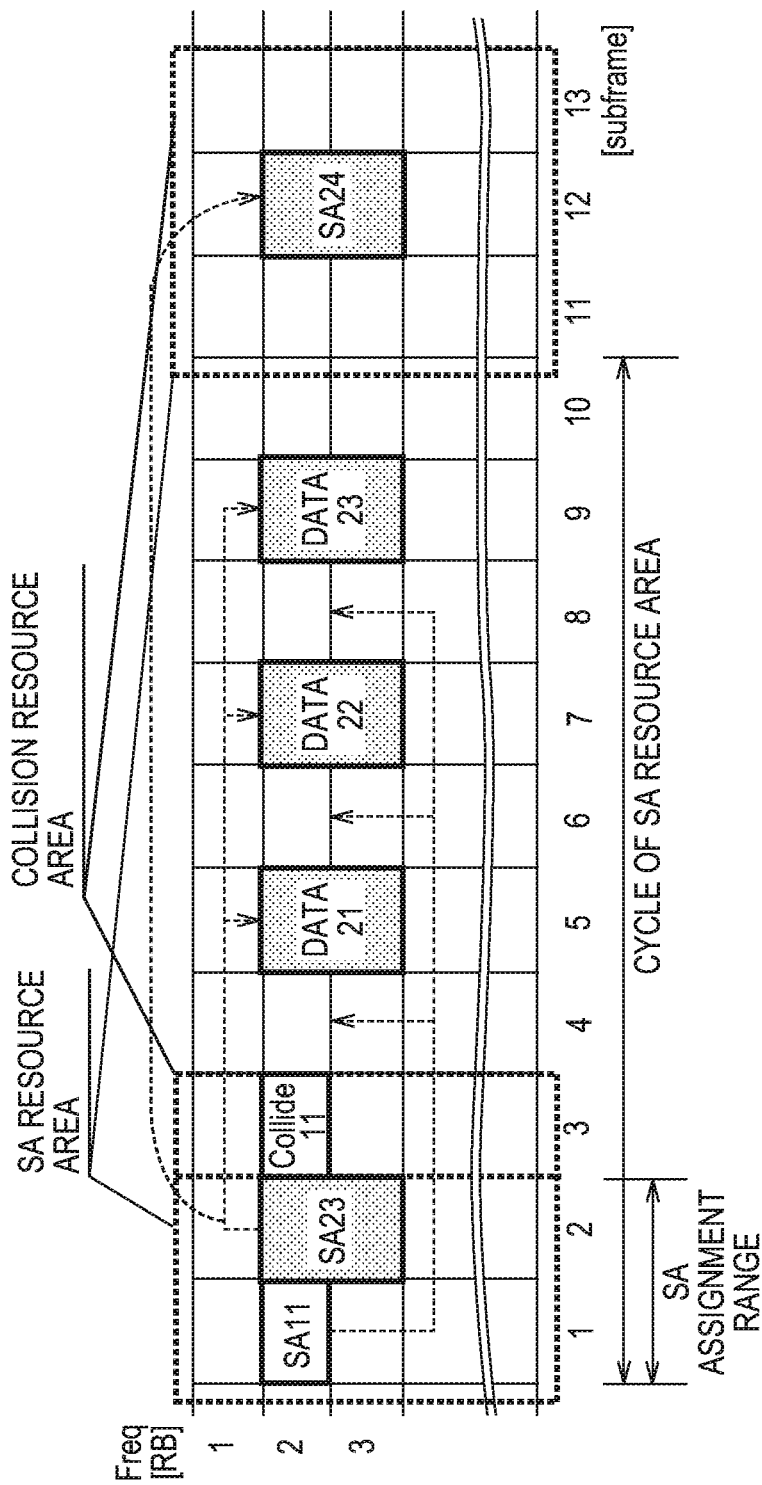
FIG. 27 is a configuration diagram of a radio frame for illustrating the operation example 6.

A modification of the operation example 6 will be described by using FIG. 26 and FIG. 27. FIG. 26 and FIG. 27 are configuration diagrams of a radio frame for illustrating the operation example 6.

In the modification of the operation example 6, even when the UE 100-2 that transmits the SA receives collision information, the thinking about a change in the location of the SA resource is omitted when the SA is transmitted periodically in continuation.

As shown in FIG. 26, the explanation is proceeded with assuming that the provision of a collision resource area in which a time-frequency resource (a collision resource) used for transmitting collision information is provided adjacent to the SA resource area is stipulated in the configuration information or the like. Moreover, the collision resource area is shared in transmitting collision information to the first [subframe] and the second [subframe] of the SA resource area.

The UE 100-1 transmits the SA 11 and the UE 100-2 transmits the SA 12. FIG. 26 is a case when there is no collision of SAs.

Next, as shown in FIG. 27, collision information (Collide 11) is transmitted using a collision resource within the collision resource area from the UE 100-3. Each of the UE 100-1 and the UE 100-2 receives the collision information.

Here, when the UE 100-1 is the UE that starts transmitting the SA, the UE 100-1 determines that the possibility of collision of the SAs of the UE 100-1 itself is high, and thus aborts transmitting the D2D communication data. The UE 100-1 thinks about a change in the location of the SA resource.

On the other hand, when the UE 100-2 periodically transmits the SA in continuation, the UE 100-2 determines that the possibility of collision of the SAs of the UE 00-2 itself is low, and thus does not abort transmitting the D2D communication data. Thereafter, the UE 100-2 omits the thinking about a change in the location of the SA resource.

Alternatively, in order to identify which SAs of the first [subframe] or those of the second [subframe] in the SA resource area have collided, the UE 100-3 uses a separable signal array to transmit the collision information. Alternatively, in order to identify which SAs of the first [subframe] or those of the second [subframe] in the SA resource area have collided, the UE 100-3 uses a collision resource in a slot unit corresponding to each of the first [subframe] and the second [subframe] to transmit the collision information.

According to the modification of the operation example 6, it becomes possible to grasp a SA resource which is used to transmit SAs when a collision of the SAs occurs.

(M) Operation Example 7

Figure 28:
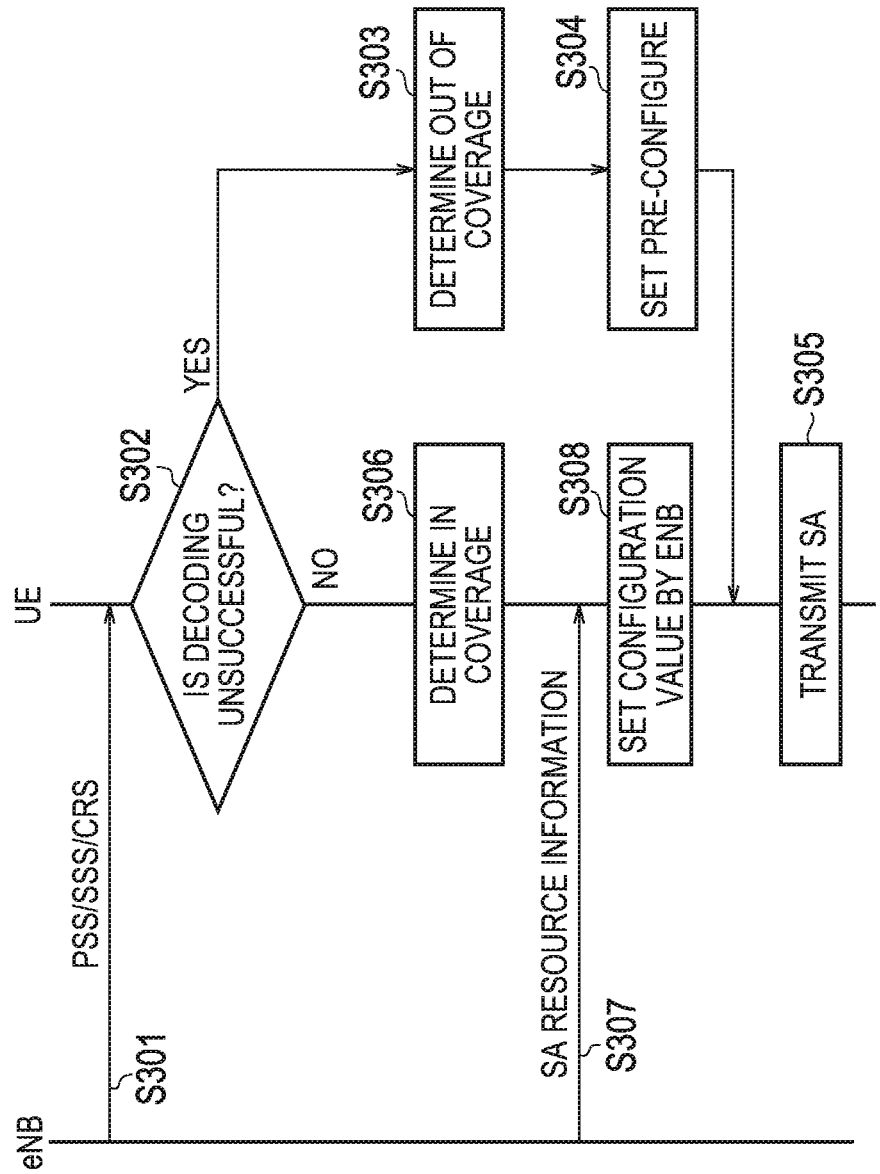
FIG. 28 is a sequence diagram of a radio frame for illustrating an operation example 7.
Figure 31:
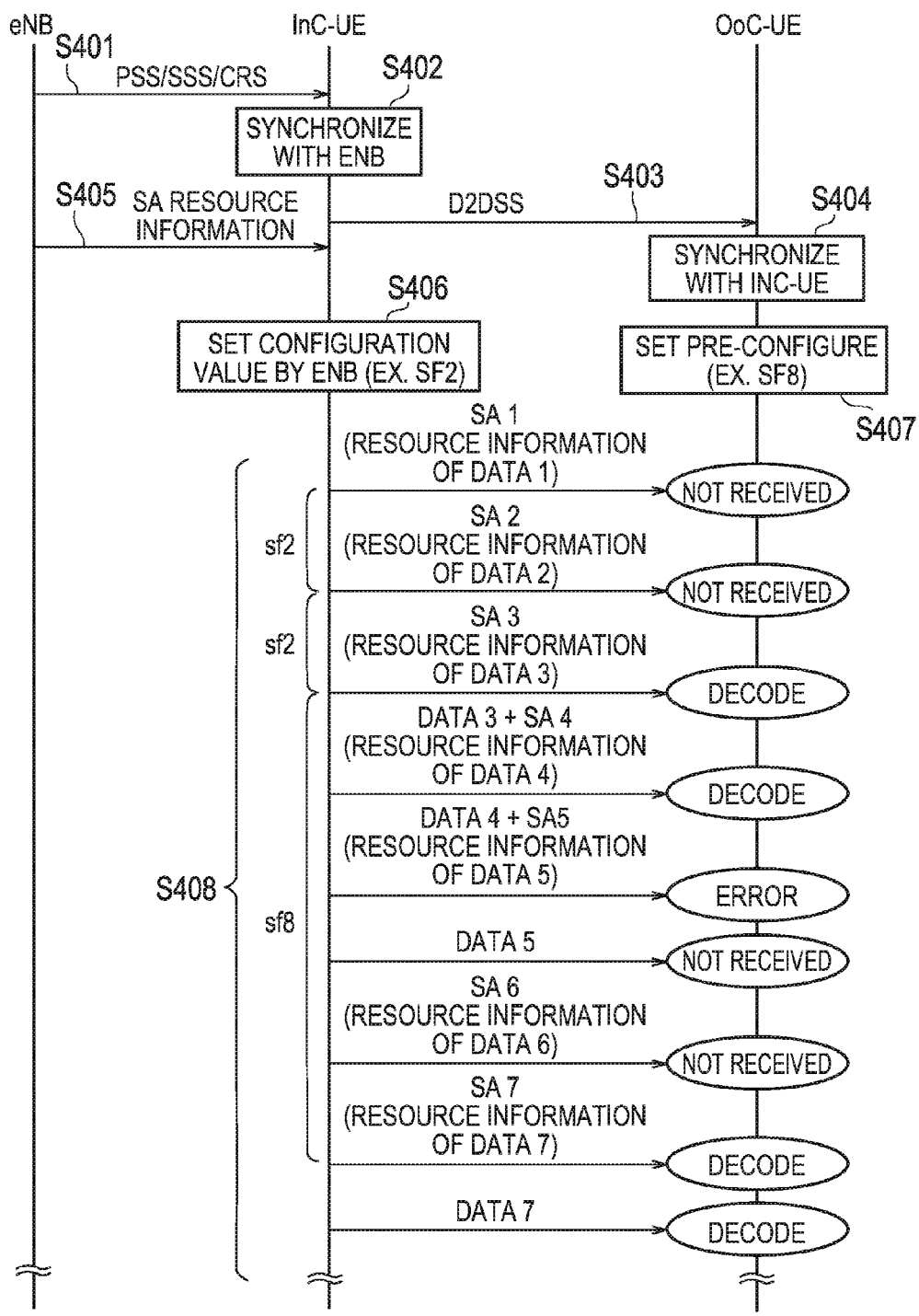
FIG. 31 is a sequence diagram for illustrating the operation example 7.
Figure 32:
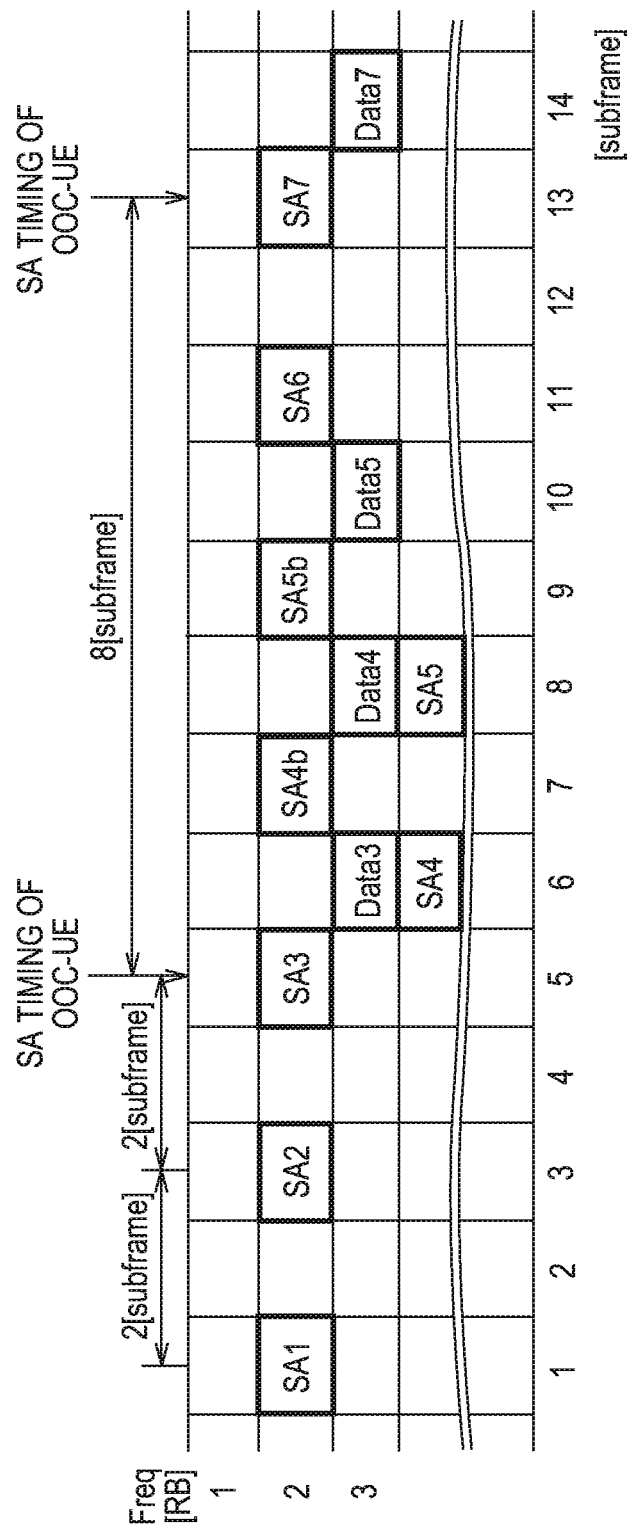
FIG. 32 is a configuration diagram of a radio frame for illustrating the operation example 7.

An operation example 7 will be described using FIG. 28 to FIG. 32. FIG. 28 is a sequence diagram for illustrating the operation example 7. FIG. 29 and FIG. 30 are diagrams for illustrating the operation example 7. FIG. 31 is a sequence diagram for illustrating the operation example 7. FIG. 32 is a configuration diagram of a radio frame for illustrating the operation example 7.

In the operation example 7, the proper use of the SA resource information and the configuration information is explained. Specifically, depending on whether or not the UE 100 exists in a cell managed by the eNB 200, the UE 100 switches the resource information and the configuration information, and decides the SA resource and the data resource. Here, the resource information is at least any one of the SA resource information and the data resource information. The details are explained below.

As illustrated in FIG. 28, in step S301, the eNB 200 broadcasts a predetermined radio signal. The predetermined radio signal is a synchronization signal (PSS: Primary Synchronization Signal/SSS: Secondary Synchronization Signal) or a cell reference signal (CRS: Cell Reference Signal), for example. The UE 100 receives a predetermined radio signal from the eNB 200.

In step S302, the UE 100 attempts decoding of the predetermined radio signal from the eNB 200. When the UE 100 fails to decode the radio signal (in the case of "Yes"), the process of step S303 is executed. On the other hand, when the UE 100 is successful in decoding the radio signal (in the case of "No"), the process of step S304 is executed.

In step S303, the UE 100 determines to be located out of coverage. It is noted that the UE 100 determines to be located out of coverage also when it is not possible to receive the radio signals from all eNBs 200 (that is, the reception level of the radio signals from all eNBs 200 is below a threshold value).

In step S304, in order to decide the SA resources and data resources on the basis of the configuration information, the UE 100 performs Pre-configure setting. In this way, when it is not possible to receive the resource information from the eNB 200, the UE 100 is capable of appropriately deciding the SA resources and the data resources. Thereafter, the UE 100 decides the SA resources and data resources on the basis of the configuration information (the Pre-configure setting).

In step S305, the UE 100 uses the decided SA resource to transmit the SAs. The UE 100 may use the SA resources to transmit, together with the SAs, flag information indicating whether the UE 100 is located out of coverage. For example, the flag information indicates "1" when the UE 100 is located in coverage (in the case of In Coverage), and indicates "0" when the UE 100 is located out of coverage (in the case of Out of Coverage). Here, since the UE 100 is located out of coverage, the flag information indicates positioning out of coverage.

On the other hand, in step S306, the UE 100 determines that the UE 100 exists in a cell of the eNB 200 to which transmits a predetermined radio signal.

In step S307, the eNB 200 transmits resource information (specifically, the SA resource information) to the UE 100. The UE 100 receives the resource information.

In step S308, in order to decide the SA resources and data resources on the basis of the resource information received from the eNB 200, the UE 100 sets the configuration value indicated by the SA resource information received from the eNB 200. Thereafter, the UE 100 decides the SA resources and data resources on the basis of the SA resource (the configuration value). Thereafter, the UE 100 performs the process of step S305.

It is noted that the UE 100 may transmit, together with the SAs, flag information indicating that the UE 100 is not located out of coverage.

Moreover, when a cycle of the SA resource area (a transmission opportunity of the SA) is set periodically, the eNB 200 may set the configuration value of the eNB 200 to an integral multiple or in an integral submultiple of the cycle of the SA resource area (the transmission opportunity of the SA) in the configuration information. In other words, when the configuration information indicates that a cycle of the SA resource area is the first cycle, the eNB 200 sets the SA resource information indicating the SA resource area provided in the second cycle, which is an integral multiple or an integral submultiple of the first cycle.

For example, as shown in FIG. 29, the eNB 200 transmits the SA resource information of a predetermined cycle through SIB. Moreover, as shown in FIG. 30, the eNB 200 selects, as the (update information of the) configuration information, an integral multiple or an integral submultiple of a predetermined cycle included in the SA resource information. The eNB 200 transmits the (update information of the) configuration information indicating the SA resource information of the selected cycle, to the UE 100.

As a result, the UE located out of coverage (OoC-UE) and the UE located in coverage of a cell (InC UE) is capable of gaining an opportunity of receiving D2D communication data without changing an operation of transmitting/receiving the SAs.

Specifically, as shown in FIG. 31 and FIG. 32, in step S401, the eNB 200 transmits a predetermined radio signal (PSS/SSS/CRS).

In step S402, the UE located within coverage (the InC-UE) synchronizes with the eNB 200 on the basis of the predetermined radio signal.

In step S403, the InC-UE transmits a synchronization signal (D2DSS) for the D2D communication.

In step S404, the UE located out of coverage (the OoC-UE) synchronizes with the InC-UE on the basis of the D2DSS signal.

In step S405, the eNB 200 transmits the SA resource information to the InC-UE.

In step S406, the InC-UE sets the configuration value indicated by the SA resource information (the eNB 200). Specifically, the InC-UE sets the cycle of the SA resource area to two [subframes].

In step S407, the OoC-UE sets the configuration value indicated by the configuration information. Specifically, the OoC-UE sets the cycle of the SA resource area to eight [subframes].

In step S408, the InC-UE transmits the SA 1, SA 2, SA 3, SA 4b, SA 5b, SA 6, and SA 7 in a cycle of two [subframes] (see FIG. 32). On the other hand, since the cycle of the SA resource area is eight [subframes], the OoC-UE is capable of receiving (decoding) the SA 3 and the SA 7. Moreover, the OoC-UE is capable of receiving (decoding) DATA 3 and the SA 4 on the basis of the data resource indicated by the SA 3. Moreover, the OoC-UE is capable of acquiring DATA 7 on the basis of the data resource indicated by the SA 7.

FIG. 31 show a case where the OoC-UE fails the reception based on the data resource indicated by the SA 4 and has not acquired DATA 4 and the SA 5. An OoC-UE having not acquired the SA 5 is not able to receive DATA 5.

According to the operation example 7, the UE located out of coverage and the UE located in coverage of a cell is capable of gaining an opportunity of receiving D2D communication data without changing an operation of transmitting/receiving the SAs.

(N) Modification of Operation Example 7

Figure 33:
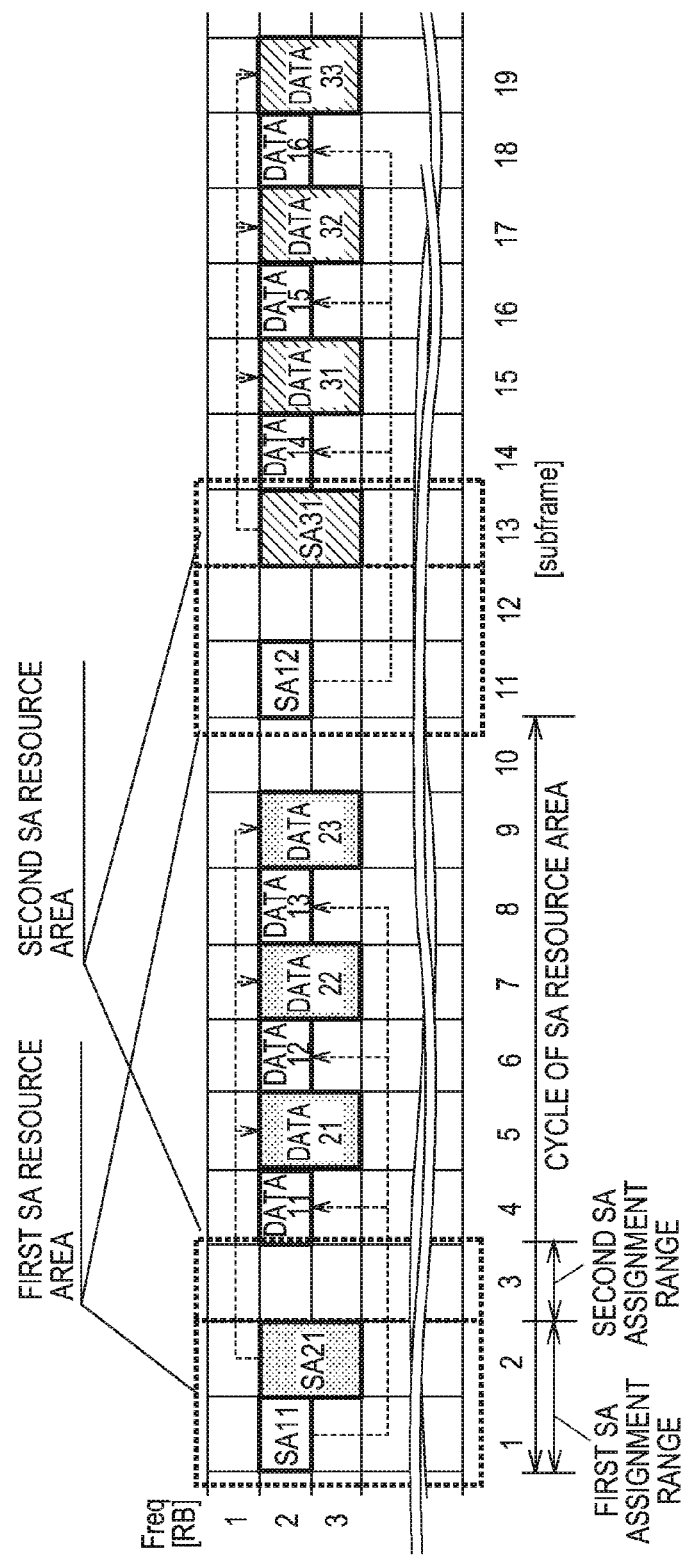
FIG. 33 is a configuration diagram of a radio frame for illustrating the operation example 7.

A modification of the operation example 7 will be described by using FIG. 33. FIG. 33 is a configuration diagram of a radio frame for illustrating the operation example 7.

In the modification of the operation example 7, when the UE 100 existing in a cell managed by the eNB 200 does not receive the SA resource information from the eNB 200, the UE 100 decides an SA resource.

As shown in FIG. 33, the available SA resources are provided in a first SA resource area on the basis of the SA resource information designating the SA resource from the eNB 200. In a second SA resource area, SA resources available in the UE 100 for which an SA resource is not designated from the eNB 200 are provided. Specifically, when SA resource information designating SA resources from the eNB 200 is not transmitted, and an unused data resource exists, the UE 100 uses the SA resources within the second SA resource area in order to use the unused data resource.

Specifically, as shown in FIG. 33, the UE 100-1, on the basis of the SA resource information from the eNB 200, uses the SA resources within the first SA resource area to transmit the SA 11. Moreover, the UE 100-1 uses the data resources indicated by the SA 11 to transmit the DATAs 11 to 13. Similarly, the UE 100-2, on the basis of the SA resource information from the eNB 200, uses the SA resources within the first SA resource area to transmit the SA 21. Moreover, the UE 100-2 uses the data resources indicated by the SA 21 to transmit the DATAs 11 to 23. In the next cycle, the UE 100-1 similarly transmits the SA 12. On the other hand, the UE 100-2 does not transmit the SA.

Due to the occurrence of an unused SA resource within the SA resource area as a result of scanning of the SA resource area, the UE 100-3 determines that an unused data resource exists. The UE 100-3 uses an SA resource within the second SA resource area to transmit the SA 31. The UE 100-3 infers the location (subframes 15, 17, and 19) of the data resources in the next cycle corresponding to the location (subframes 5, 7, and 9) of the data resources indicated by the SA 21 in the previous cycle as the location of the unused data resources. The UE 100-3 uses the inferred unused data resources to transmit the DATAs 31 to 33.

According to the modification of the operation example 7, it is possible to effectively utilize the time-frequency resource.

(O) Operation Example 8

Figure 34:
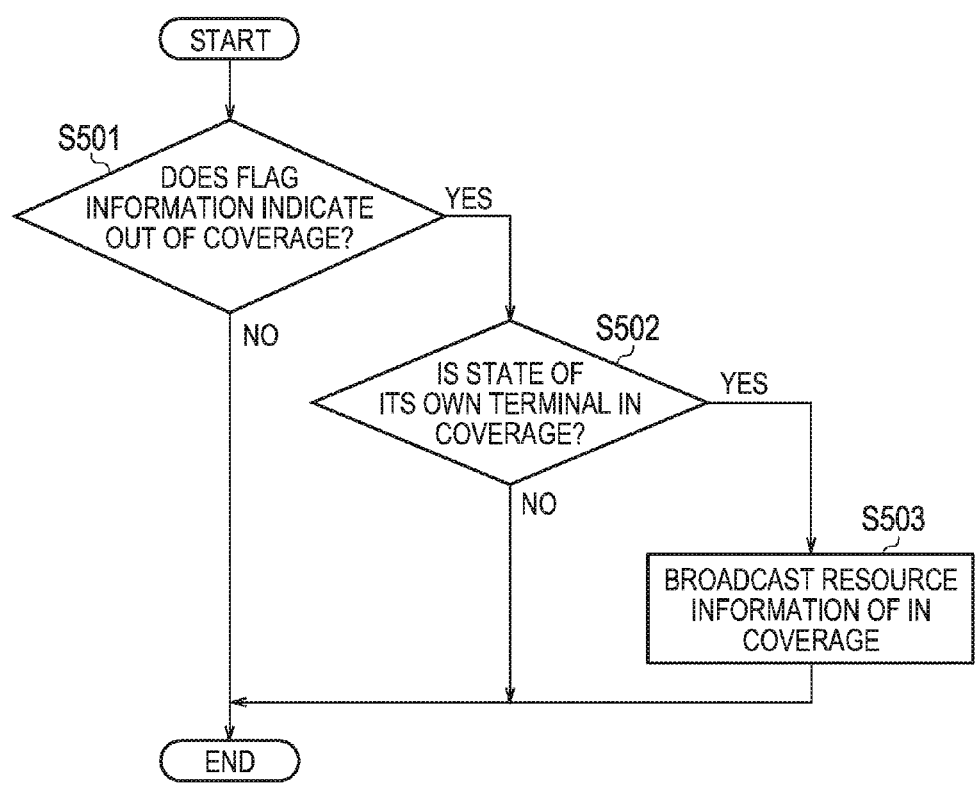
FIG. 34 is a flowchart for illustrating an operation example 8.
Figure 35:
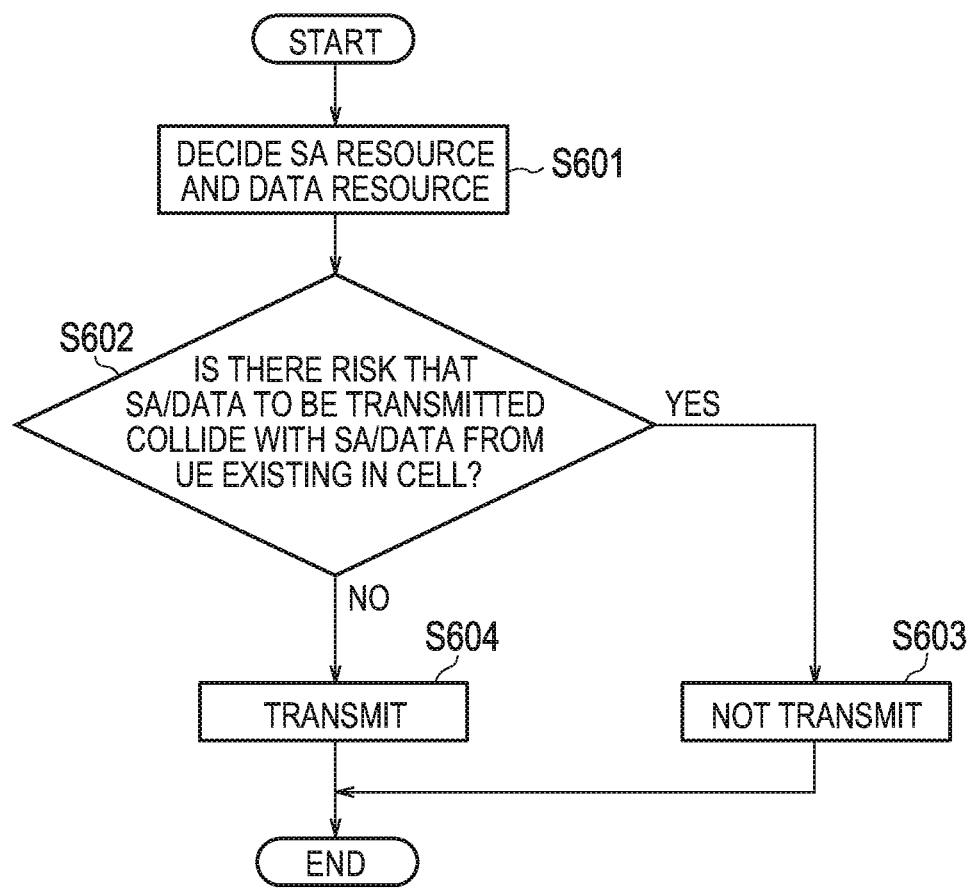
FIG. 35 is a flowchart for illustrating the operation example 8.

An operation example 8 will be described using FIG. 34 and FIG. 35. FIG. 34 and FIG. 35 are flowcharts for illustrating the operation example 8. Specifically, FIG. 34 is a flowchart for illustrating an operation of the UE 100 located in coverage. FIG. 35 is a flowchart for illustrating an operation of the UE 100 located out of coverage.

In the operation example 8, an operation of the UE 100 located in coverage, and an operation of the UE 100 located out of coverage will be described.

(1) Operation of UE 100 Located in Coverage Area

An operation of the UE 100 located in coverage will be described using FIG. 34.

As shown in FIG. 34, in step S501, the UE 100 scans the SA resource area. Specifically, the UE 100 scans the SA resource area having a limited range on the basis of the SA resource information. The UE 100 uses an SA resource within the SA resource area to receive the transmitted SA.

Upon receiving flag information along with the received SA, the UE 100 determines whether or not the flag information indicates that the other UE 100 at the transmission source of the flag information is out of coverage. When the flag information indicates that the other UE 100 is out of coverage, the UE 100 executes the process of step S502. On the other hand, when the flag information indicates that the other UE 100 is not out of coverage, the UE 100 ends the process. It is noted that when the UE 100 receives a plurality of instances of flag information, the UE 100 ends the process only when each of the plurality of instances of the flag information indicates that the other UE 100 is not out of coverage. When any of the plurality of instances of the flag information indicates that the other UE 100 is out of coverage, the UE 100 executes the process of step S502.

In step S502, the UE 100 determines whether or not the UE 100 itself exists in a cell. The UE 100, for example, executes the process of from the above-described step S402 to S404, and determines whether or not the UE 100 itself exists in the cell.

When the UE 100 itself exists in a cell, the UE 100 executes the process of step S503. When the UE 100 itself does not exist in a cell (that is, the UE 100 is located out of coverage), the UE 100 ends the process.

In step S503, the UE 100 transmits, to the other UE 100, the resource information (the control resource information and/or the data resource information) received from the cell in which the UE 100 exists. The UE 100 may notify the resource information through broadcast, or may transmit the resource information to the UE 100 located out of coverage through unicast. Moreover, the UE 100 may use an SA resource to transmit the resource information, or may use a data resource to transmit the resource information.

The UE 100 may transmit, together with the resource information, flag information indicating that the UE 100 is not located out of coverage.

As a result, the other UE 100 located out of coverage is capable of receiving the resource information. The other UE 100 that receives the resource information is capable of performing the operation described below.

(2) Operation of UE 100 Located Out of Coverage

Next, an operation of the UE 100 (the UE 100-2) located out of coverage will be described using FIG. 35.

The explanation is proceeded with assuming that when the UE 100-2 is located out of coverage, the UE 100-2 receives the resource information from the UE 100-1 existing in a cell.

As shown in FIG. 35, in step S601, the UE 100-2 decides the SA resources and data resources. The UE 100-2 decides the SA resources and the data resources by prioritizing the resource information (the SA resource information and the data resource information) over the configuration information.

It is noted that when the contents of the data resource information are more recent than the contents of the updated configuration information, the UE 100-2 may decide the SA resources and the data resources on the basis of the configuration information. The UE 100-2 may decide the SA resources and the data resources on the basis of the resource information received from the UE 100-1.

In step S602, when the UE 100-2 determines that there is a risk of collision of SA transmitted using the SA resource decided in step S601 and SA and/or the D2D communication data transmitted by the UE 100 existing in a cell (in the case of "Yes"), the UE 100-2 executes the process of step S603, and when the UE 100-2 determines that there is no risk of collision (in the case of "No"), the UE 100-2 executes the process of step S604.

Moreover, when the UE 100-2 determines that there is a risk of collision of the D2D communication data transmitted using the data resource decided in step S601 with SA and/or the D2D communication data transmitted by the UE 100 existing in a cell (in the case of "Yes"), the UE 100-2 executes the process of step S603, and when the UE 100-2 determines that there is no risk of the collision (in the case of "No"), the UE 100-2 executes the process of step S604.

For example, the UE 100-2 performs a scan of the SA resources within the resource area having a limited range on the basis of the resource information from the UE 100-1 existing in a cell. The UE 100-2 grasps the SA resources used for transmitting the SA, and infers the SA resources used for transmitting the SA on the basis of the resource information. Moreover, the UE 100-2 grasps the data resources indicated by the received SA.

The UE 100-2 determines whether the inferred SA resources and the grasped data resources (the resources of the UE 100 located in coverage) do nor overlap the SA resources and the data resources that the UE 100-2 uses for transmission (the resources of the UE 100-2 itself). When the UE 100-2 determines that the resources of the UE 100 located in coverage overlap the resources of the UE 100-2 itself, the UE 100-2 determines that there is a risk of a collision, and when the UE 100-2 determines that the resources of the UE 100 located in coverage do not overlap the resources of the UE 100-2 itself, the UE 100-2 determines that there is no risk of a collision.

Moreover, for example, when the contents that limit the range of the SA resource area and the data resource area are matching in the configuration information and the resource information, the UE 100-2 may determine that there is no risk of a collision.

In step S603, the UE 100-2 does not transmit the SA and the D2D communication data using the decided SA resources and the data resources. The UE 100-2 may decide new SA resources and data resources on the basis of the resource information.

In step S604, the UE 100-2 transmits the SA using the decided SA resources, and transmits the D2D communication data using the decided data resources.

As a result of such an operation of the UE 100-2, when D2D communication is performed around a cell end, it is possible to reduce a collision of SAs and/or the D2D communication data of the UE 100-2 located out of coverage, with SAs and/or the D2D communication data of the UE 100 existing in a cell.

Other Embodiments

As described above, the present disclosure has been described with the embodiments. However, it should not be understood that those descriptions and drawings constituting a part of the present disclosure limit the present disclosure. From this disclosure, a variety of alternate embodiments, examples, and applicable techniques will become apparent to one skilled in the art.

For example, in the above-described embodiment, when the UE 100 is located at the edge of a cell, the UE 100 may transmit resource information received from a cell in which the UE 100 exists, to another UE 100. For example, when a reception level of a radio signal from the eNB 200 is within a predetermined range, the UE 100 determines that the UE 100 is located at the edge of a cell. Alternatively, the UE 100 may determine whether the UE 100 is located at the edge of a cell by GNSS information.

Furthermore, in the above-described embodiment, the UE 100 may repeatedly transmit the same SA at a bit level by using the decided SA resources. Specifically, when the decided SA resources are configured by a plurality of control channel elements, the UE 100 transmits the same SA in each of the plurality of control channel elements.

It is noted that the UE 100 may reduce a bit number of the SA with a high priority (for example, an emergency SA), and repeatedly transmit the SA with a high priority in one SA resource (a resource block).

Figure 36:
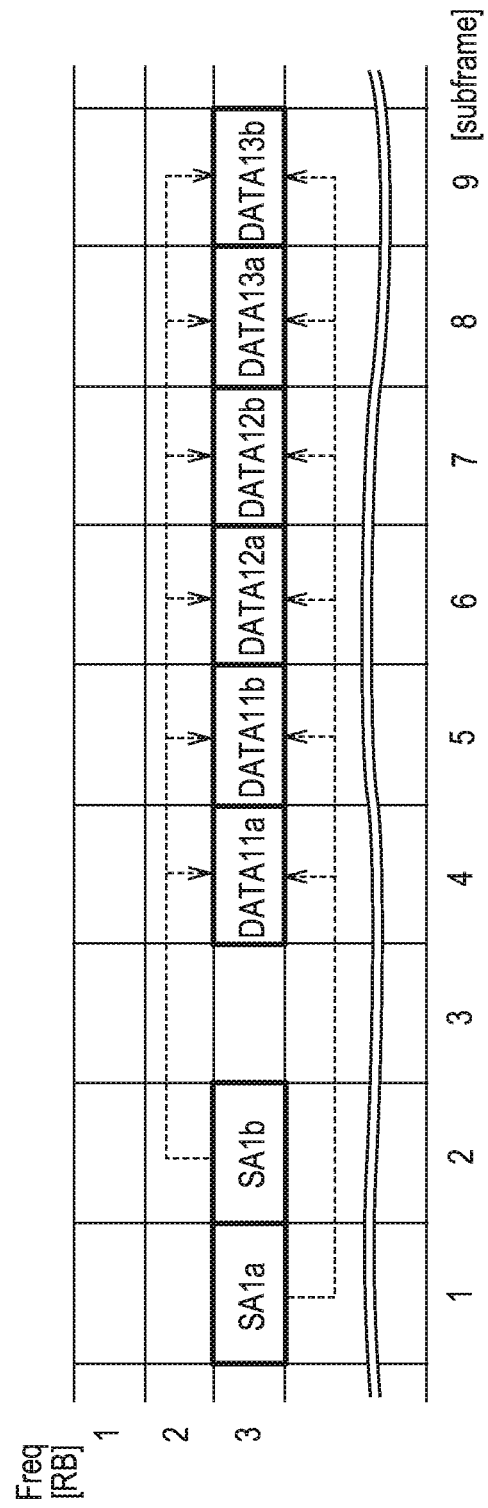
FIG. 36 is a configuration diagram of a radio frame in a mobile communication system according to another embodiment.

Furthermore, in the above-described embodiment, the UE 100 may repeatedly transmit the same SA in units of resource blocks by using the decided SA. Specifically, a description will be provided with reference to FIG. 36. FIG. 36 is a configuration diagram of a radio frame in a mobile communication system according to another embodiment.

In FIG. 36, SA 1a and SA 1b are the same information and indicate the locations of the same data resources. Each of the SA 1a and the SA 1b indicates the locations of data resources of DATA 11a to DATA 13b. The DATA 11a and the DATA 11b are the same D2D communication data, the DATA 12a and the DATA 12b are the same D2D communication data, and the DATA 13a and the DATA 13b are the same D2D communication data.

It is noted that, in FIG. 36, the UE 100 repeatedly transmits the same SA in units of resource blocks in a time axis direction; however, the present disclosure is not limited thereto. The UE 100 may repeatedly transmit the same SA in units of resource blocks in a frequency axis direction.

In the above-described embodiments, each operation example may be combined and executed, where necessary.

In addition, the aforementioned embodiment has described an example in which the present disclosure is applied to the LTE system. However, the present disclosure is not limited to the LTE system, and may also be applied to systems other than the LTE system.

APPENDIX (1) Introduction

Resource allocation method with scheduling assignment (SA) for D2D communication was proposed. In this appendix, we consider D2D communication resource allocation with SA from collision avoidance perspective. In this appendix, we focus on the allocation for out of coverage. The similar scheme can be used for in-coverage case as well. However, in-coverage case is not discussed in this appendix.

(2) Design Considerations for D2D Communication Resource Allocation Using Scheduling Assignments SA assisted resource allocation provides a possibility of efficient collision avoidance. There are several advantages of SA.

Figure 37:
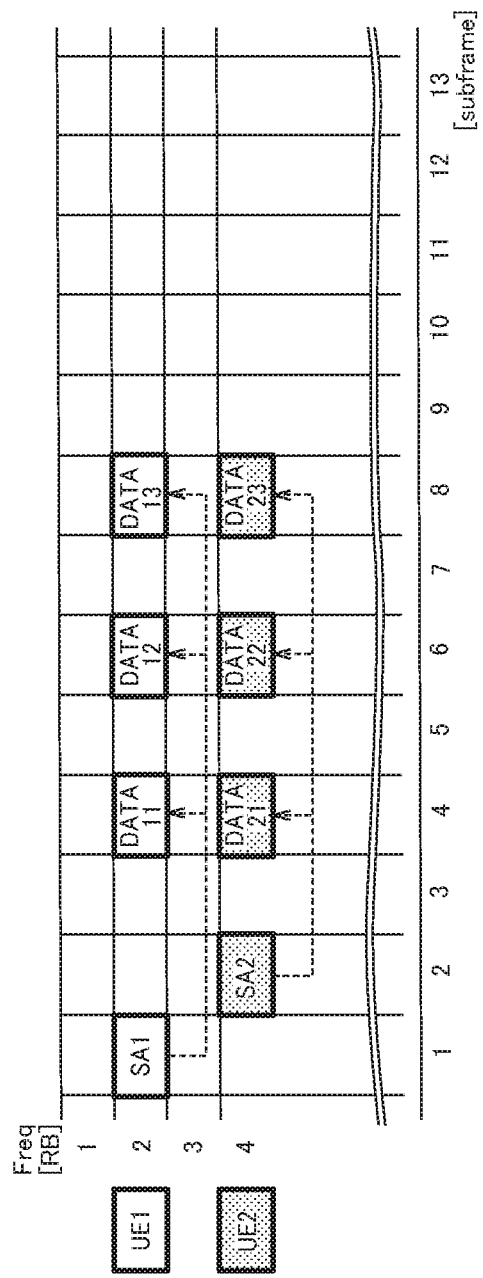
FIG. 37 is a diagram for illustrating an example usage of SA for collision avoidance of data.

As discussed, the FIG. 37 shows how UE2 may detect SA1 transmitted by UE1 and use this information to schedule its own data transmissions by avoiding those resources listed in SA1. In order to further improve the above we propose additional principles for the SA based resource allocation schemes.

Figure 38:
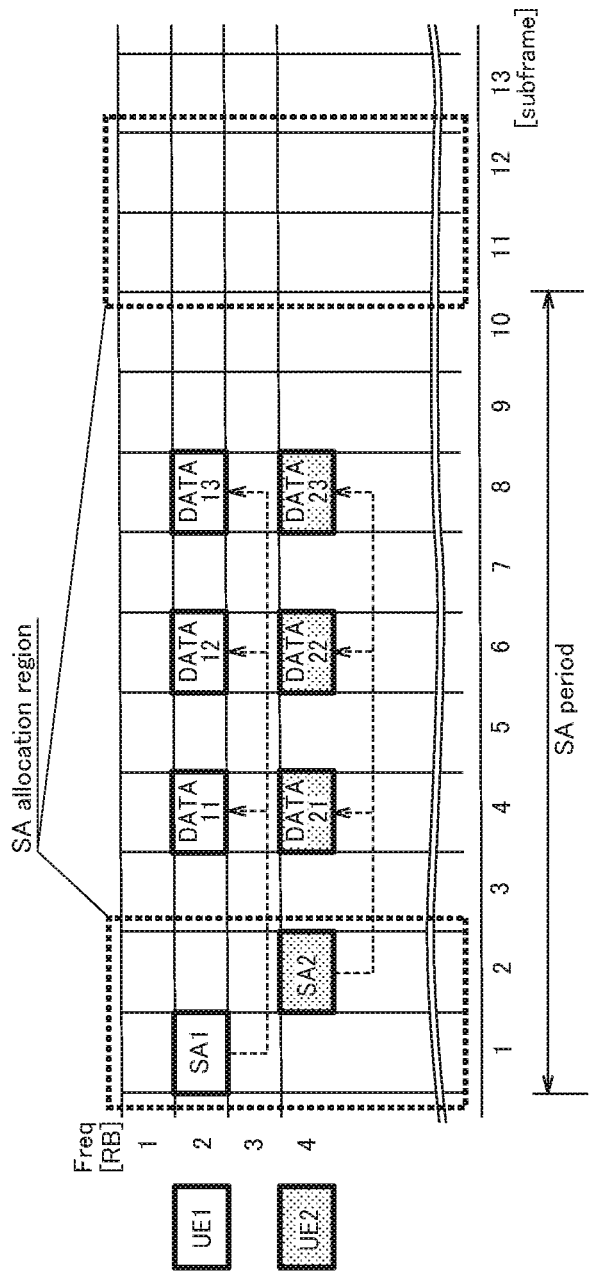
FIG. 38 is a diagram for illustrating SA period and SA regions.

(3) Design Considerations for D2D Communication Resource Allocation Rules for Out of Coverage (3.1) SA Transmissions In order to reduce receiver complexity SA transmissions are periodic and using pre-defined time-frequency resources known to the receiver. As an example, shown in the FIG. 38, the location for SA transmission resources can be grouped together within a region for simpler detection.

Proposal 1: If SA is agreed then SAs should be transmitted periodically and grouped together within a given region.

(3.2) Transmission of Data

Figure 39:
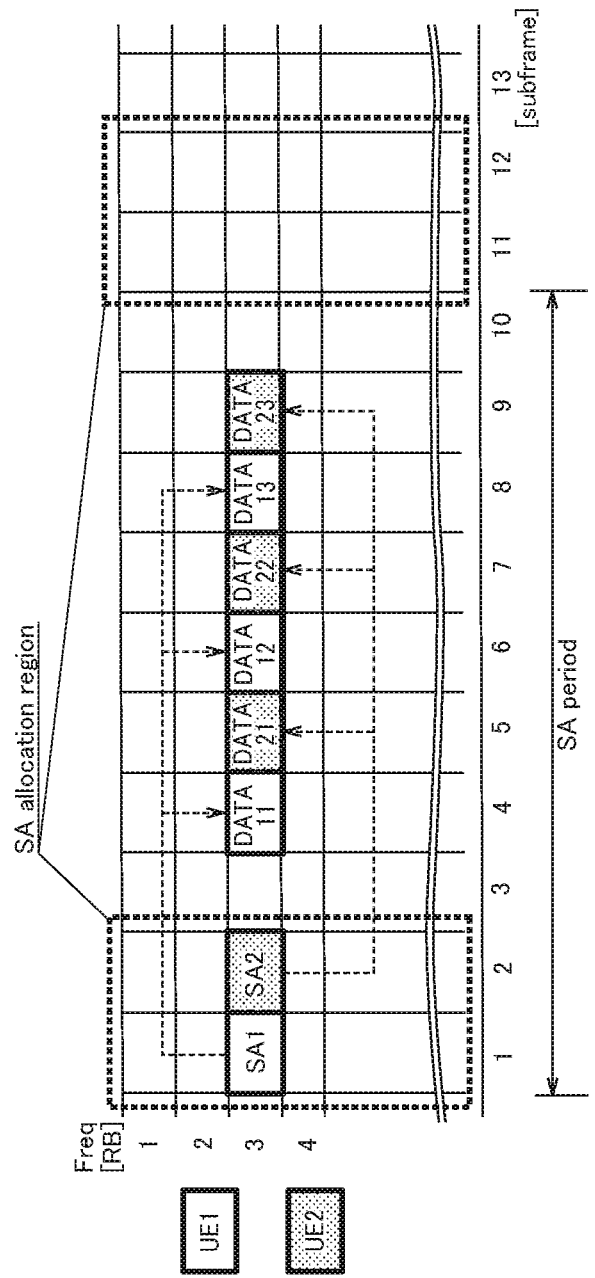
FIG. 39 is a diagram for illustrating each SA determining a location of associated data transmissions resources.

In this section a method is described to avoid data collisions. Each SA is mapped to a certain set of time-frequency resources that can be used for data transmissions. Each D2D is allowed to select a resource for its SA transmission as described in the above section. However, the same D2D UE can only transmit its data in resources that are associated with the SA resource location. In other words, the location of the SA determines the location of the data transmission resources. As shown in the FIG. 39, SA1 and SA2 points to data 11, 12, 13 and data 21, 22, 23 respectively. This method avoids collisions between data transmissions.

Proposal 2: In order to avoid data collisions SA is mapped to a certain set of time-frequency resources that can be used for data transmissions.

(3.3) Reduction in Collision of SA Transmissions

Figure 40:
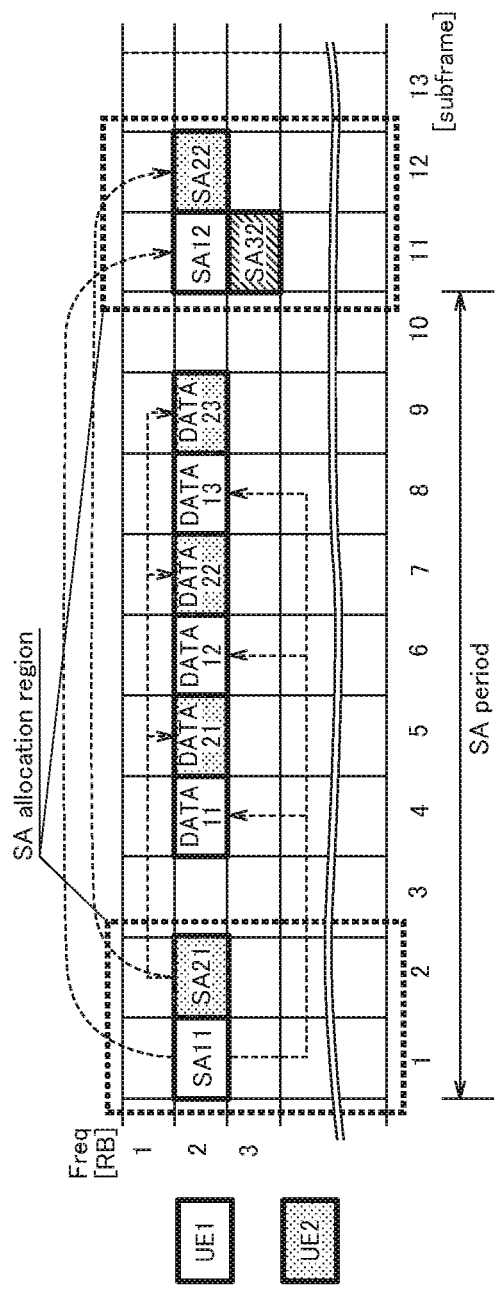
FIG. 40 is a diagram for illustrating initial SA transmission and the subsequent SA transmissions.

The above method describes the allocation of data transmissions using SA as a pointer. However, the above method is not sufficient to avoid collisions between SA transmissions. In this section we present a method to reduce SA transmission collisions. Each D2D UE monitors the SA region to detect SA transmitted by the other D2D UEs. Using this information the same D2D UE avoids transmitting its SA in the same resource used by other D2D UEs during the previous SA transmissions. For example, as shown in FIG. 40, UE1 and UE2 transmit SA11 and SA21 respectively. A third D2D UE (not shown in the figure) detects those transmissions and then transmits its SA32 at a different location. UE1 and UE2 can use the same resources used in the previous iteration for SA12 and SA22, respectively. In the initial first SA period UE1 and UE2 can randomly select resources for SA transmissions.

Proposal 3: If SA is agreed then to reduce SA collisions, D2D UE avoids transmitting its SA in the same resource used by the other D2D UEs in the previous SA transmissions.

Proposal 4: If SA is agreed, and then the resources for the initial SA transmissions are randomly selected in the SA region.

In addition, the entire content of is incorporated in the present specification by reference.

As described above, the mobile communication system and the user terminal according to the present disclosure are able to efficiently scan control information, and thus they are useful in a mobile communication field.

The invention claimed is:

1. A first user terminal, comprising:
at least one processor and at least one memory coupled to the at least one processor, wherein
the at least one processor is configured to perform processes of:
determining a plurality of first radio resources to be used for transmitting control information from the first user terminal to a second user terminal; and
directly transmitting the control information to the second user terminal in each of the plurality of first radio resources, by Device-to-Device (D2D) communication,
the control information is included in each of the plurality of first radio resources, and
the control information transmitted in each of the plurality of first radio resources indicates a same at least one subframe of second radio resources to be used for transmitting data by the D2D communication.

2. The first user terminal according to claim 1, wherein the at least one processor is configured to perform the process of randomly determining the plurality of first radio resources from a resource area in which radio resources, which are able to be used for transmitting the control information, are arranged.

3. The first user terminal according to claim 1, wherein the at least one processor is configured to perform a process of receiving information on the plurality of first radio resources from a base station.

4. The first user terminal according to claim 3, wherein the at least one processor is configured to perform the process of receiving the information by downlink control information from the base station.

5. The first user terminal according to claim 3, wherein the at least one processor is configured to perform the process of receiving the information by a Radio Resource Control (RRC) message from the base station.

6. The first user terminal according to claim 3, wherein the at least one processor is configured to perform the process of transmitting the information if the first user terminal exists in a cell managed by the base station.

7. An apparatus for a first user terminal comprising:
at least one processor and at least one memory coupled to the at least one processor, wherein
the at least one processor is configured to perform processes of:

determining a plurality of first radio resources to be used for transmitting control information from the first user terminal to a second user terminal; and directly transmitting the control information to the second user terminal in each of the plurality of first radio resources, by Device-to-Device (D2D) communication, the control information is included in each of the plurality of first radio resources, each of first radio resources comprises one resource block, and the control information transmitted in each of the plurality of first radio resources indicates a same at least one subframe of second resources to be used for transmitting data by the D2D communication.

8. The first user terminal according to claim 1, wherein each of first radio resources comprises one resource block.

9. A first user terminal, comprising:

at least one processor and at least one memory coupled to the at least one processor, wherein sets of radio resources are arranged by repeating a set of radio resources in a time direction, the a set of radio resources being for control information of Device-to-Device (D2D) communication and for data corresponding to the control information, the at least one processor is configured to perform processes of:

determining a plurality of first radio resources within a first set included in the sets of radio resources, wherein the plurality of first radio resources is to be used for transmitting first control information from the first user terminal to a second user terminal; and directly transmitting the first control information to the second user terminal in each of the plurality of first radio resources by the D2D communication, the first control information is included in each of the plurality of first radio resources within the first set, the first control information transmitted in each of the plurality of first radio resources indicates a same at least one subframe of second radio resources within the first set, to be used for transmitting first data by the (D2D) communication, and the at least one processor is configured to perform processes of directly transmitting the first data by the D2D communication by using the second radio resources within the first set.

* * * * *